United States Patent

Acharya et al.

[11] Patent Number: 5,903,559
[45] Date of Patent: May 11, 1999

[54] METHOD FOR INTERNET PROTOCOL SWITCHING OVER FAST ATM CELL TRANSPORT

[75] Inventors: Arup Acharya, North Brunswick; Rajiv Dighe, Princeton Junction, both of N.J.

[73] Assignee: NEC USA, Inc., Princeton, N.J.

[21] Appl. No.: 08/771,559

[22] Filed: Dec. 20, 1996

[51] Int. Cl.[6] ............................ H04L 12/46; H04L 12/56; H04J 3/24

[52] U.S. Cl. .......................... 370/355; 370/395; 370/254; 370/466; 370/347; 395/200.66

[58] Field of Search ..................... 370/395, 355, 370/254, 466, 347, 399, 351, 244, 338; 395/200.66

[56] References Cited

U.S. PATENT DOCUMENTS

| | | | |
|---|---|---|---|
| 5,440,547 | 8/1995 | Esaki et al. | 370/395 |
| 5,506,847 | 4/1996 | Shobatake | 370/338 |
| 5,517,497 | 5/1996 | Le Boudec et al. | 370/399 |
| 5,600,638 | 2/1997 | Bertin et al. | 370/351 |
| 5,623,605 | 4/1997 | Keshav et al. | 395/200.66 |
| 5,638,371 | 6/1997 | Raychaudhuri et al. | 370/347 |
| 5,689,501 | 11/1997 | Takase et al. | 370/244 |
| 5,748,626 | 5/1998 | Esaki et al. | 370/355 |
| 5,764,645 | 6/1998 | Bernet et al. | 370/466 |
| 5,781,537 | 7/1998 | Ramaswami et al. | 370/254 |

FOREIGN PATENT DOCUMENTS

| | | |
|---|---|---|
| IN95-145 | of 0000 | Japan . |
| 6-311185 | 11/1994 | Japan . |
| 7-273801 | 10/1995 | Japan . |
| 8-125692 | 5/1996 | Japan . |
| WO9728505 | 8/1997 | WIPO . |

OTHER PUBLICATIONS

H. Esaki, et al. "High Speed Datagram Delivery over Internet using ATM Technology," INTERAP 95, pp. 1–9.
Abstract of JP–A 08–125692.
Abstract of JP–A 09–036908.
Abstract of JP–A 09–172457.

*Primary Examiner*—Parshotam S. Lall
*Assistant Examiner*—Philip B. Tran
*Attorney, Agent, or Firm*—Sughrue, Mion, Zinn, Macpeak & Seas, PLLC

[57] ABSTRACT

A method for transporting Internet Protocols (IP's) over an Asynchronous Transfer Mode (ATM) network that exhibits the strengths of ATM, namely packet interleaving (using cell-based transport) with Quality of Service support for connection-oriented traffic (such as multiclass native ATM traffic and flows-based IP traffic using RSVP), while optimizing the connectionless requirements of existing IP traffic. Advantageously, both the IP protocol stack and ATM protocol stack operate as peers over ATM cell transport hardware. The method exploits an "implicit" signaling/control phase characteristic of IP traffic/protocols thereby minimizing setup. The implicit signaling phase is used to map a flow from a routed path to a switched path immediately upon transmission of a first packet. Similarly, particular packets may be immediately transported over the routed path even after establishment of the switched path. This mapping from the routed path to the switched path and vice versa is based upon the structure/semantics of the protocol driving the flow and not just the duration of the flow as done with prior-art methods. Consequently, while prior-art methods require cell-level counters to monitor activity (or lack thereof) for switching state, the method uses explicit control messages and soft-state at the IP level (as opposed to the cell level) to do the same. Advantageously, the method imposes no switching overhead as there is no coordination between neighboring nodes when a flow is moved from the routed path to the switched path.

13 Claims, 20 Drawing Sheets

FIG. 1(a) PRIOR ART

| IP STACK | I-PNNI |
|---|---|
| MPOA | |
| q.2931 | |
| SAAL | |
| ATM SWITCH | |

USER

FIG. 1(b) PRIOR ART

| IP STACK |
|---|
| IFMP |
| GSMP |
| AAL-5 |
| ATM SWITCH |

USER

FIG. 1(c) PRIOR ART

| IP STACK | I-PNNI |
|---|---|
| GSMP-L | q.2931 |
| OAM | SAAL |
| ATM SWITCH | |

USER

| VPI | VC | PORT |
|---|---|---|
| 0 | 0 | ROUTER |
| 1 | 1 | ROUTER |
| 2 | 2 | ROUTER |
| n | m | ROUTER |

FIG. 5(b)

| VC1 | VC2 | VC3 | VCn |
|---|---|---|---|
| Buf1 | Buf2 | Buf3 | Bufn |

FIG. 5(c)

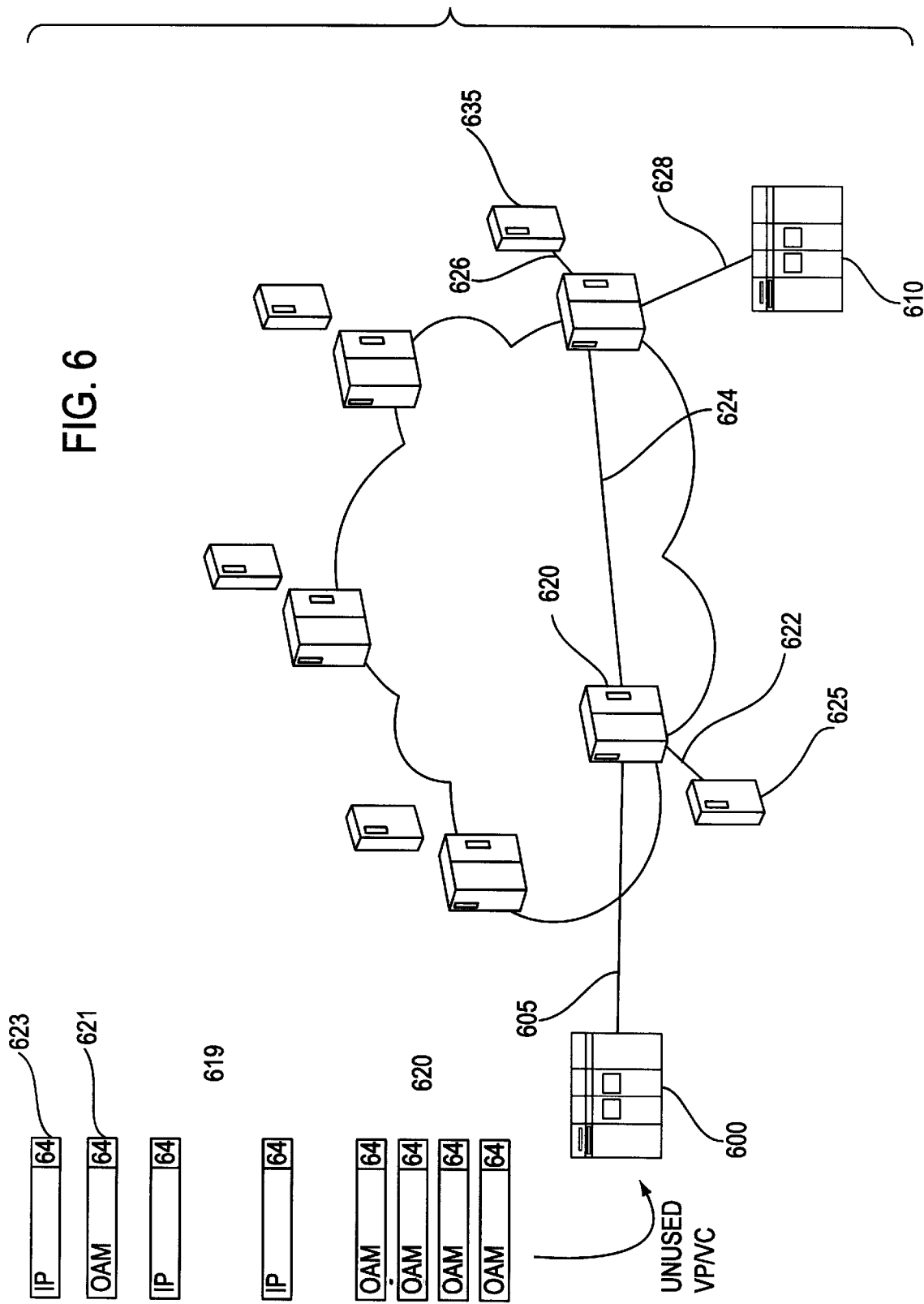

METHOD FOR INTERNET PROTOCOL SWITCHING OVER FAST ATM CELL TRANSPORT

TECHNICAL FIELD

This invention relates to the field of computer communications and networking and in particular to a method for switching Internet Protocol (IP) packets over an Asynchronous Transfer Mode (ATM) network.

DESCRIPTION OF THE PRIOR ART AND PROBLEM

Transmission Control Protocol/Internet Protocol (TCP/IP) refers to the Internet suite of protocols. It includes a set of standards that specify how computers communicate and gives conventions for connecting networks and routing traffic through the networks. It has been used to connect the Internet—a worldwide internetwork connecting universities, research laboratories, Department of Defense installations, and corporations.

The Internet protocols are a result of a Defense Advanced Research Projects Agency (DARPA) research project on network interconnection in the late 1970's. It was mandated on all United States defense long-haul networks in 1983 but was not widely accepted until the integration with 4.2 BSD (Berkeley Software Distribution) UNIX. The popularity of TCP/IP is based on a number of factors, including:

Robust client-server framework. TCP/IP is an excellent client-server application platform, especially in wide-area network (WAN) environments;

Information sharing. Thousands of academic, defense, scientific and commercial organizations share data, electronic mail, and services on the connected Internet using TCP/IP; and General availability. Implementations of TCP/IP are available on nearly every popular computer operating system. Source code is widely available for many implementations. Additionally, bridge, router and network analyzer vendors all offer support for the TCP/IP protocol family within their products.

Transmission Control Protocol (TCP) and Internet Protocol (IP) are only two members of the Internet protocol suite. IP is a protocol that provides packet delivery for all is of the other protocols within the TCP/IP family. It provides a best-effort, connectionless delivery system for computer data. That is, IP packets are not guaranteed to arrive at their destination, nor are they guaranteed to be received in the sequence in which they were sent.

The most common higher-level IP protocol is TCP. Like IP, TCP supplies a reliable, connection oriented protocol over (or encapsulated within) IP. TCP guarantees the delivery of packets, ensures proper sequencing of the data, and provides a checksum feature that validates both the packet header and its data for accuracy. In the event that IP corrupts or loses a TCP/IP packet, TCP is responsible for retransmitting the faulty packets. This reliability defines TCP/IP as the protocol of choice for session-based data transmission, client-server applications, and critical services such as electronic mail.

This reliability does not come without a price, however. TCP headers require the use of additional bits to provide proper sequencing information, as well as a mandatory checksum to ensure reliability of both the TCP header and the packet data. To guarantee successful data delivery, the protocol also requires the recipient to acknowledge successful receipt of data. Such acknowledgement (ACKs) generate additional network traffic, diminishing the level of data throughput in favor of reliability. To reduce the impact on performance, TCP implements a throttle mechanism that allows the required frequency of ACKs to vary with the reliability of the data link. This permits the use of fewer ACK's on highly reliable connections and therefore, less computing resources.

High-performance, high-reliability networks are oftentimes used with TCP/IP. One such high-performance network technology is asynchronous transfer mode (ATM) and it is frequently the foundation on which state-of-the-art networks are being built.

In ATM, all information to be transferred is packed into fixed-size slots called cells. These cells have a 48 octet information field and a 5 octet header. Whereas the information field is available for the user, the header field carries information that pertains to the ATM layer functionality itself, mainly the identification of the cells.

Importantly, ATM has two hierarchical levels, namely 1) virtual channel level and 2) virtual path level. A virtual channel is a concept used to describe the unidirectional transport of ATM cells associated by a common, unique identifier value. This identification is called the virtual channel identifier (VCI) and is part of the cell header. Similarly, a virtual path is a concept used to describe unidirectional transport of cells belonging to virtual channels that are associated by a common identifier value. This identifier is called the virtual path identifier (VPI) and is also part of the cell header. All cells associated with an individual virtual channel/virtual path connections (VCC/VPC) are transported along the same route through the network. Cell sequence is preserved (first sent-first received) for all VCCs.

Running connectionless IP traffic over a connection-oriented ATM network is fraught with problems. One such problem is that a fundamental dichotomy exists between the two networking styles. In particular, IP protocols are receiver-oriented, data driven flows having control and data packets on the same logical path while native ATM is a sender-oriented protocol in which a connection is setup before data transmission.

Much prior art effort has been expended on methods for running an IP protocol stack over an ATM network stack (IP-o-ATM). Specifically, IP data is treated as data to be sent over ATM connections established via ATM signaling. Unfortunately, two problems which result from this approach is the overhead associated with ATM signaling and resulting latency.

Such problems become readily apparent when one considers that connectionless IP traffic is actually hindered due to ATM "features" such as end-to-end route selection having Quality of Service (QoS) guarantees on each link of a path. Fast setup time is a main goal of IP networking and going through an end-to-end selection process before sending a data packet is terribly inefficient for applications using IP such as the world-wide-web (WWW) in which a large number of connections may be established during a single session.

Prior art attempts to provide Internet Protocol functionality over Asynchronous Transfer Mode transport are pictorially illustrated in FIGS. 1(a) and 1(b). As can be seen from these two figures, the prior art simply places the IP "stack" on top of the other layers comprising the entire protocol stack.

An important characteristic of these prior art approach becomes apparent with further reference to FIGS. 1(a) and 1(b). There it is shown that a user of the prior art system, interacts solely with the IP layer of the overall protocol stack. That is, even though there exists an underlying ATM transport for the IP protocols, the user of these prior art systems does not have direct access to that ATM transport. In sharp contrast to this prior art and with reference to FIG. 1(c), the method of the present application imparts a "dual stack" whereby a user may utilize and/or interact with both an ATM stack and an IP stack.

We can now illustrate some of the problems of these prior art Internet Protocol control plane interactions over ATM (IP-o-ATM) approaches when applied to common IP applications.

TCP over IP-o-ATM (TCP/IP-o-ATM)

As stated previously, TCP is a connection-oriented protocol. The protocol specifies the format of the data and acknowledgements that two systems (computers) use exchange to achieve a reliable transfer, as well as the procedures the computers use to ensure that the data arrives correctly. It specifies how TCP software distinguishes among multiple destinations on a given system, and how communicating systems recover from errors such as lost or duplicated packets.

Additionally, TCP has its own set of connection signaling. In particular, messages such as SYN or SYNchronizing segment, is the first segment sent by the TCP protocol. It is used to synchronize the two ends of a connection in preparation for opening a connection. Other connection signaling messages such as SYN-ACK, and FIN serve other purposes. As a result of its connection signaling, when TCP is run over IP-o-ATM, a penalty is imposed in the form of an extra connection phase as shown in FIG. 2. This is because an entire ATM end-to-end connection needs to be established before a TCP connection setup is initiated. Hence the latency in sending the data is high.

With reference now to FIG. 2, there it shows the steps necessary to establish an end to end connection and subsequently send data over the connection using TCP. Specifically, SRC 200 issues a SETUP message 201 which is received by DEST 250. In response, DEST sends a CONNECT message 251 back to the SRC. Following this exchange, SRC sends a TCP SYN message 203 which is acknowledged by DEST with a TCP SYNACK 253. This exchange completes the TCP establishment and permits the transmission of DATA 205.

As those skilled in the art can readily appreciate, ubiquitous browsing applications like those which access the World-Wide-Web (WWW) and utilize TCP suffer excessive latency from the above scenario since each click of a mouse on a hypertext link needs to go through the above setup and synchronization before every data transfer.

IP multicast over IP-o-ATM:

The basic dichotomies between connection-oriented and connectionless networking methodologies is further highlighted when considering the mapping of IP multicast over IP-o-ATM. By way of background, multicast is an application in which an endpoint is simultaneously connected to multiple other endpoints.

With existing IP multicast protocols such as dense mode Protocol Independent Multicast (PIM) or Distance Vector Multicast Routing Protocol (DVMRP), a node sending data is completely unaware of any nodes receiving that data. The sending node simpy sends. All control actions associated with or resulting in a receiving node joining or leaving a session is initiated by the receiver.

With reference now to FIG. 3, there is shown a diagram of SRC 300, involved in a multicast connection with Receivers 320, 330 and 340 through network 310. As can be seen in this figure, transmissions 350, originating at the SRC, are simultaneously multicast (352, 354, 356) to each one of the Receivers, respectively. Since IP-o-ATM is sender-initiated, connection establishment is required before data-transfer. Therefore, it is very difficult to utilize this methodology in a multicast application where the sending node is unaware of the receiving nodes because the receiving nodes join and leave sessions at random.

One such prior-art attempt at solving the above multicast problem is called Multicast ATM Routing Server (MARS) which assumes a multicast server (MCS) model. With this system, all sending nodes transmit information to the MCS which is subsequently disseminated to the receiving nodes. Unfortunately, this system suffers from two significant drawbacks. Specifically, the system does not scale. Consequently, as the number of nodes in the multicast group increases, the MCS becomes a communications bottleneck. Additionally, the system fails to utilize inherent features of both IP multicast and cell level ATM transport, namely peer to peer distributed networking with 1-2-m hardware multicast as well as an ability to interleave packets at a cell level.

Another prior-art approach, hereinafter Prior Art Method #1, runs native IP directly on ATM hardware. In this manner, the ATM signaling protocol is completely circumvented thereby effectively removing the ATM protocol stack from the switch. With this approach, an IP module is present at every switch in a network. Default packet routing is IP-style, hop-by-hop routing over a PVC network. Flows are mapped from a PVC to a SVC based on the duration of the flow.

In this prior-art approach, shown in FIGS. 4(a)–4(c), each ATM switch 410, 420, 430, 440, 450 is equipped with a switch controller 415, 425, 435, 445, respectively. The controller interfaces to its local switch through a proprietary protocol i.e., General Switch Management Protocol (GSMP).

The switch controller communicates with similar controllers in adjacent nodes through another proprietary protocol, i.e., Flow Management Protocol (FMP). The switch controller is effectively a router with special knowledge of these two protocols, and with logic to examine flows as they pass through the switch. The switch controller examines any IP and TCP header values, determining when a flow is persistent. It then uses the FMP protocol to ask an upstream switch controller providing the flow, to divert that flow to a specific new virtual circuit. If a downstream switch controller makes the same determination, it requests a similar diversion. The local switch controller then asks the switch it controls, via GSMP, to create a cut-through connection between the VPI/VCIs representing the upstream and downstream flows.

At this point, the flow is a transient, or temporary, virtual circuit because it eventually ages out of existence. This new virtual circuit cut-through effectively shunts out the switch controller. The flow now moves at the ATM level without routing and without the ability to do so.

As depicted in FIGS. 4(a)–4(c), a certain number of packets, i.e., forty, are routed through the switch controller. A duration counter signals that this is a long duration (persistent) flow and subsequent packets are switched to a VC. Only after a certain number of packets or a duration counter elapses, do subsequent packets traverse the switched path which goes directly from source to destination through the switches.

In order to establish the VC, a switch must perform a handshake with its two nearest neighbor switches. The overhead associated with moving the packets from the routed path to the switched path is a number of signaling messages communicated between the adjacent switches.

While this prior art scheme is very simple and allows for a natural marriage between ATM hardware and IP protocols, as with the other prior-art IP-o-ATM approaches, this one suffers from several serious drawbacks as well.

In particular, this scheme is an all or nothing solution. That is, a switch in the network can support this particular protocol or native ATM, but not both. Additionally, while this scheme works very well for static unicast IP connections, a fundamental problem arises with dynamic IP applications such as IP multicast, RSVP or mobile IP. In particular, once the switched path is established, all future control packets cannot be seen by the IP processor thereby preventing any dynamic control. Finally, IP is considered as data with this scheme. As a result, multicast IP is transported by or "tunneled" in unicast IP packets (IP in IP). Consequently, scaling problems arise with situations involving large, multicast trees.

Therefore, a continuing need exists in the art for methods which solve the above problems and provide an efficient, flexible, and scalable method for transporting IP over ATM netoworks.

SOLUTION AND SUMMARY OF THE INVENTION

The above problems are solved and an advance is made over the art according to our invention whereby native IP is transported over ATM hardware while minimizing the IP setup delay. Unlike the prior-art methods, a PVC-based ATM network is not utilized and both native IP as well as native ATM is run over existing ATM hardware.

Advantageously, the method exhibits the strengths of ATM, namely packet interleaving (using cell-based transport) with Quality of Service support for connection-oriented traffic (such as multiclass native ATM traffic and flows-based IP traffic using RSVP), while optimizing the connectionless requirements of existing IP traffic. Specifically, both the IP protocol stack and ATM protocol stack operate as peers over ATM cell transport hardware.

The method operates by exploiting an "implicit" signaling/control phase characteristic of IP traffic/protocols thereby minimizing setup. The implicit signaling phase is used to map a flow from a routed path to a switched path. This mapping from the routed path to the switched path and vice versa is based upon the structure/semantics of the protocol driving the flow and not just the duration of the flow as done with prior-art methods. Consequently, while prior-art methods require cell-level counters to monitor activity (or lack thereof) for switching state, our inventive method uses explicit control messages and soft-state at the IP level (as opposed to the cell level) to do the same.

And while prior art methods for transporting IP-o-ATM need to setup communications between neighboring switches before a flow can be moved from the routed path to the switched path, our inventive method imposes no switching overhead as there is no coordination between neighboring nodes when a flow is moved from the routed path to the switched path.

Finally, our inventive method provides native mode IP-multicast with ATM hardware support without having to treat IP-multicast as an encapsulated unicast IP. Finally, support is provided, not only fore existing IP traffic but all future IP version 6 applications without sacrificing the basic advantages of IP, namely zero setup hop-by-hop communications.

Further features and advantages of the present invention, as well as the structure and operation of various embodiments of the present invention are described in detail below with reference to the accompanying drawings.

BRIEF DESCRIPTION OF THE DRAWINGS

The teachings of the present invention can be readily understood by considering the following detailed description in conjunction with the accompanying drawings, in which:

FIG. 1(a) is a prior-art protocol stack showing IP layered on an ATM switch;

FIG. 1(b) is an alternative prior-art protocol stack showing IP layered on an ATM switch;

FIG. 1(c) shows the co-resident IP and ATM stack according to the teachings of the present invention;

FIG. 5(b) shows the initial mapping of VC and VP entries in a routing table according to the present invention;

FIG. 5(c) shows VC-buffer relationship according to the present invention;

FIG. 6 shows the operation of our enhanced IPSOFACTO method according to the teachings of the present invention;

DETAILED DESCRIPTION

A preferred embodiment of the invention will now be described while referring to the figures, several of which may be simultaneously referred to during the course of the following description.

Figure 2:
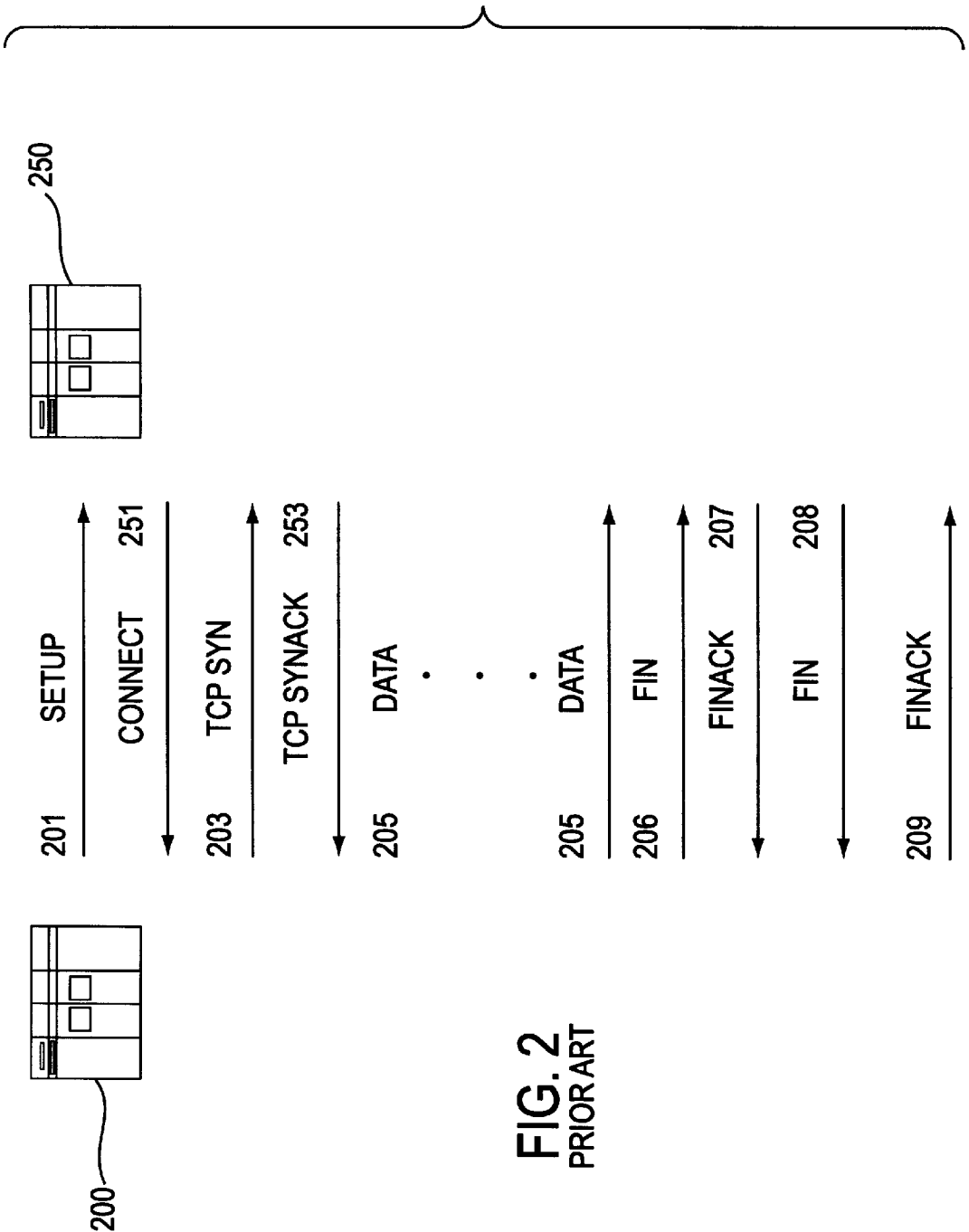
FIG. 2 shows the prior-art flow of messages necessary to effect a TCP connection between source and destination.
Figure 3:
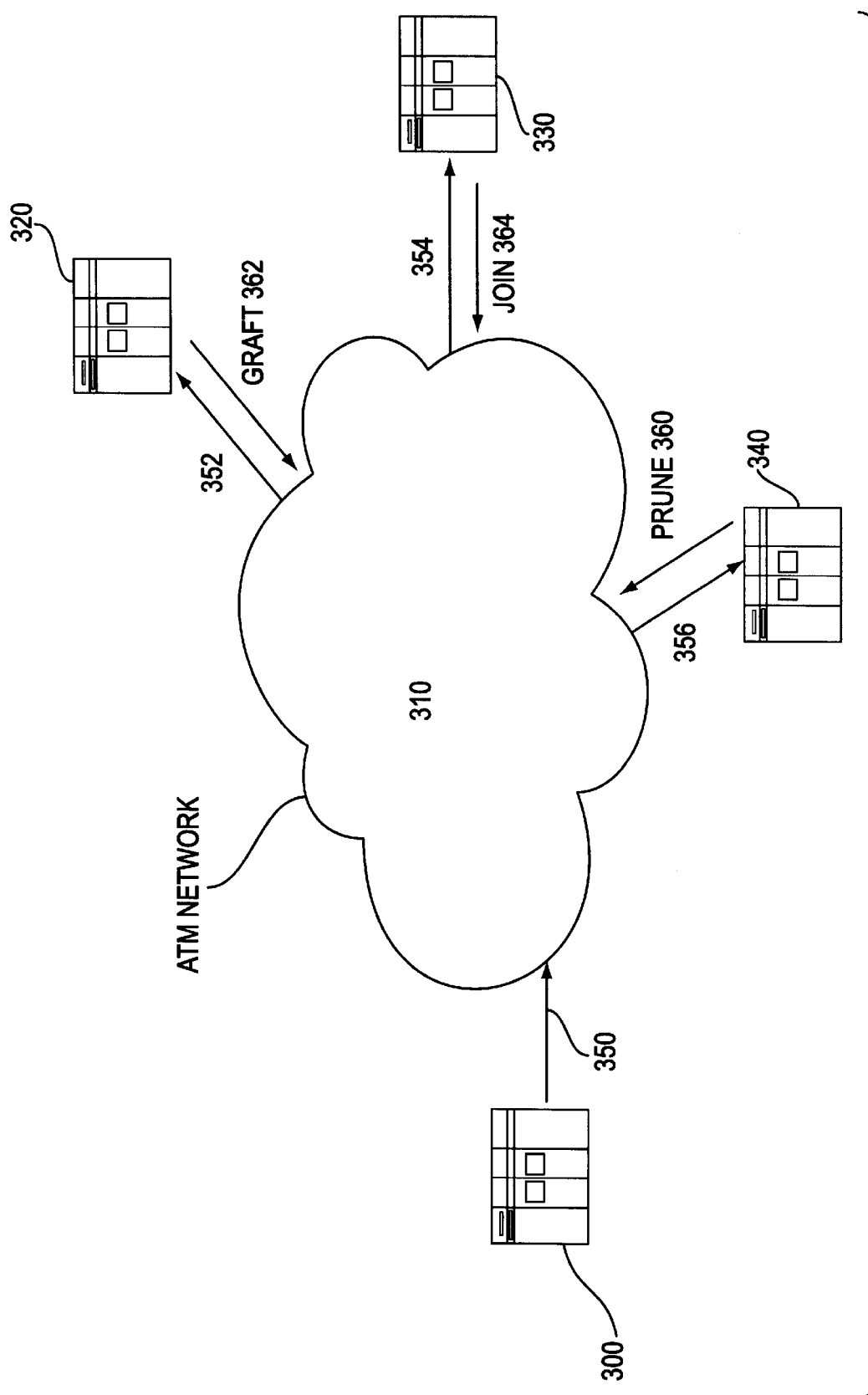
FIG. 3 shows a flow and representative messages sent between a source and multiple receivers in a multicast application.
Figure 4A:
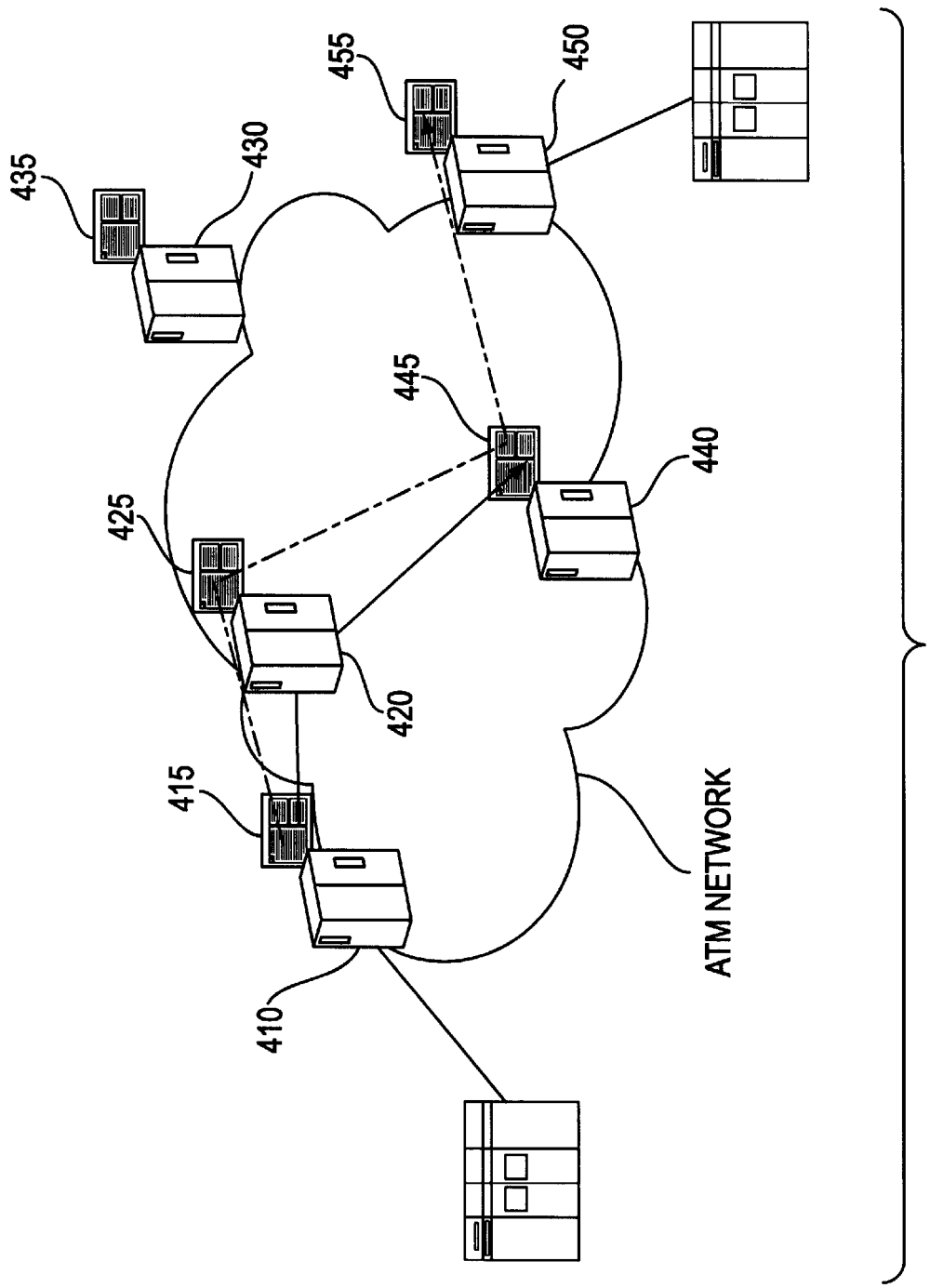
FIGS. 4(a)–4(c) show a prior art establishment of an IP-o-ATM connection between a source and destination.
Figure 4B:
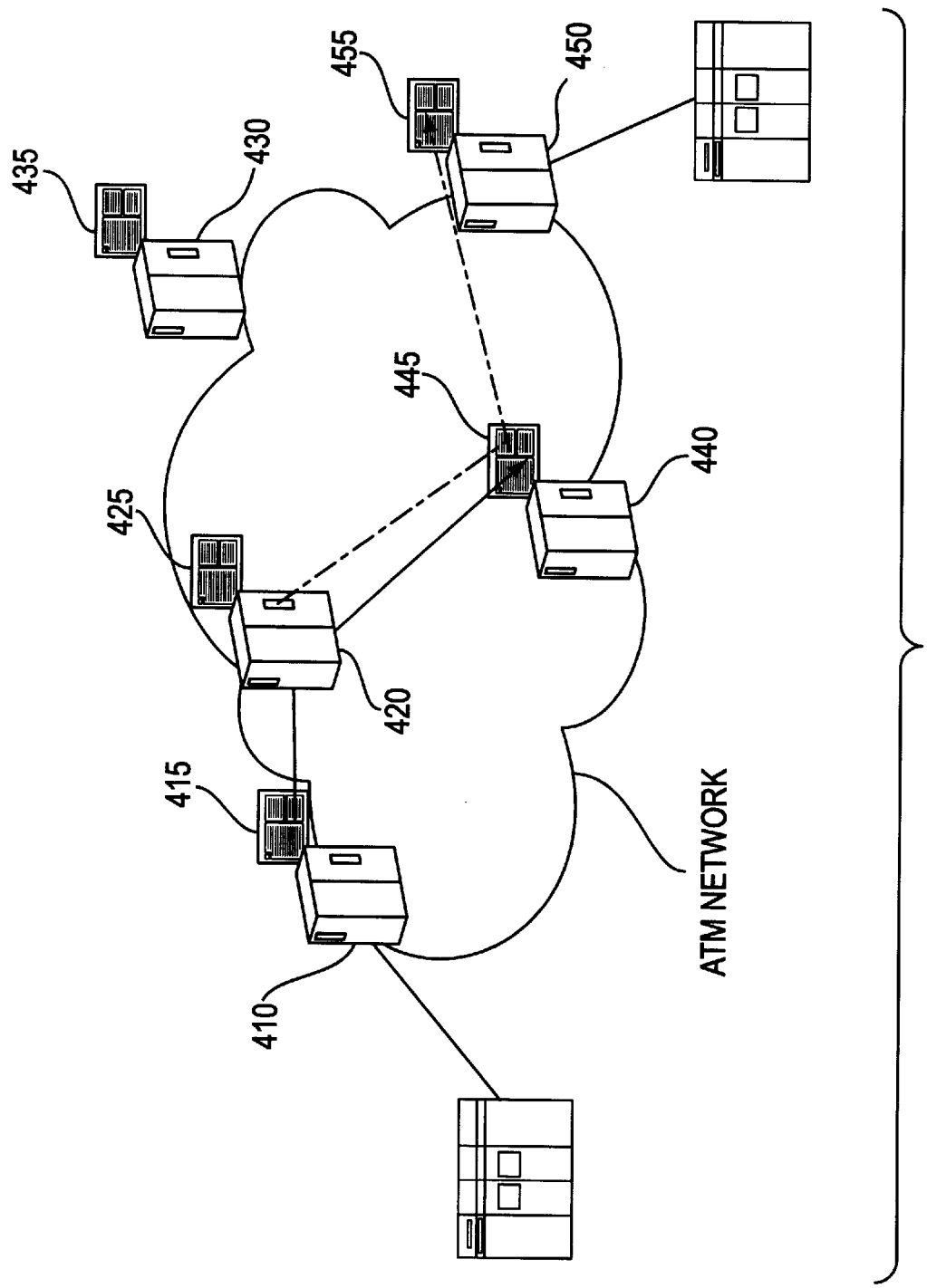
Figure 4C:
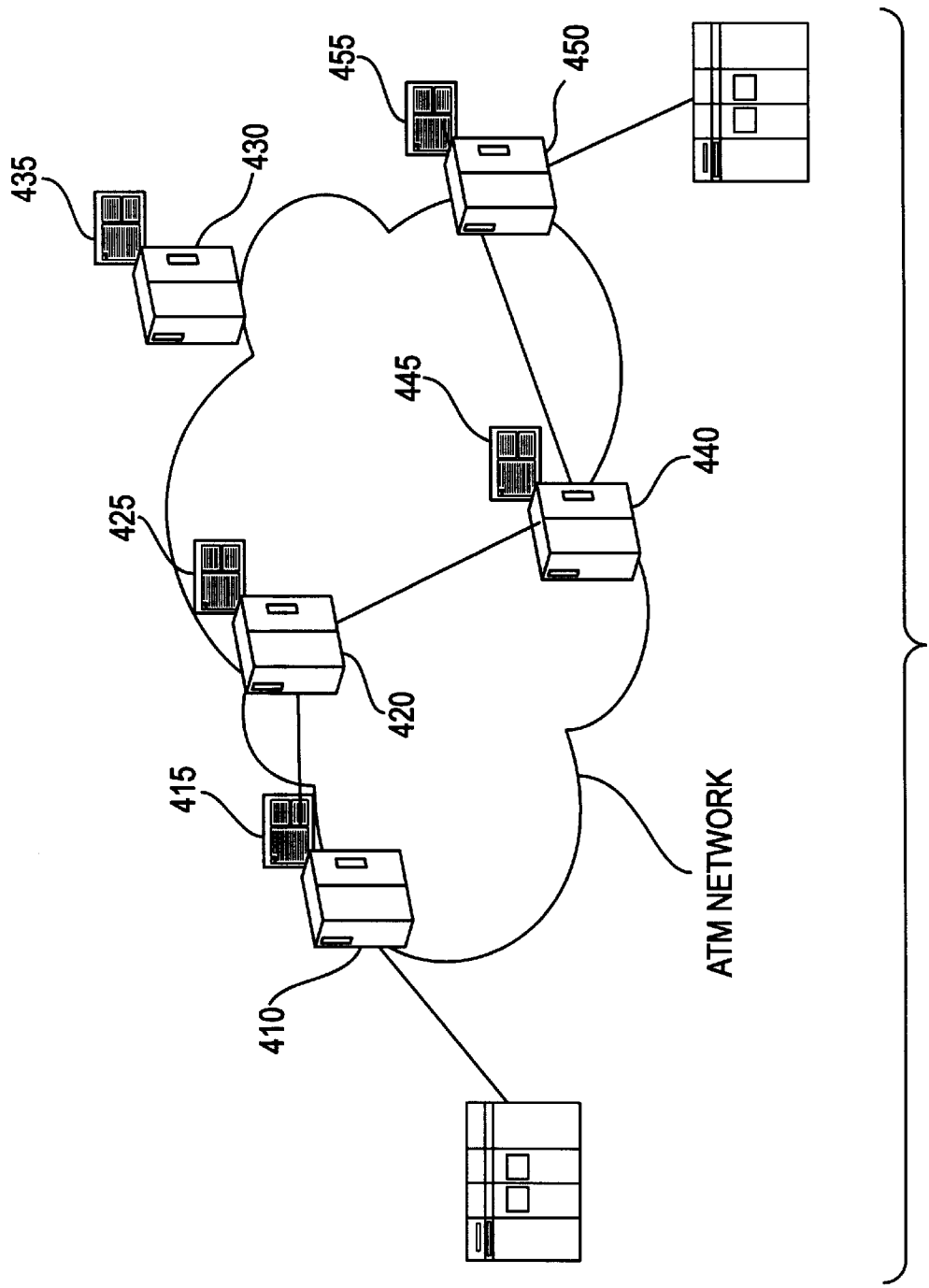
Figure 5A:
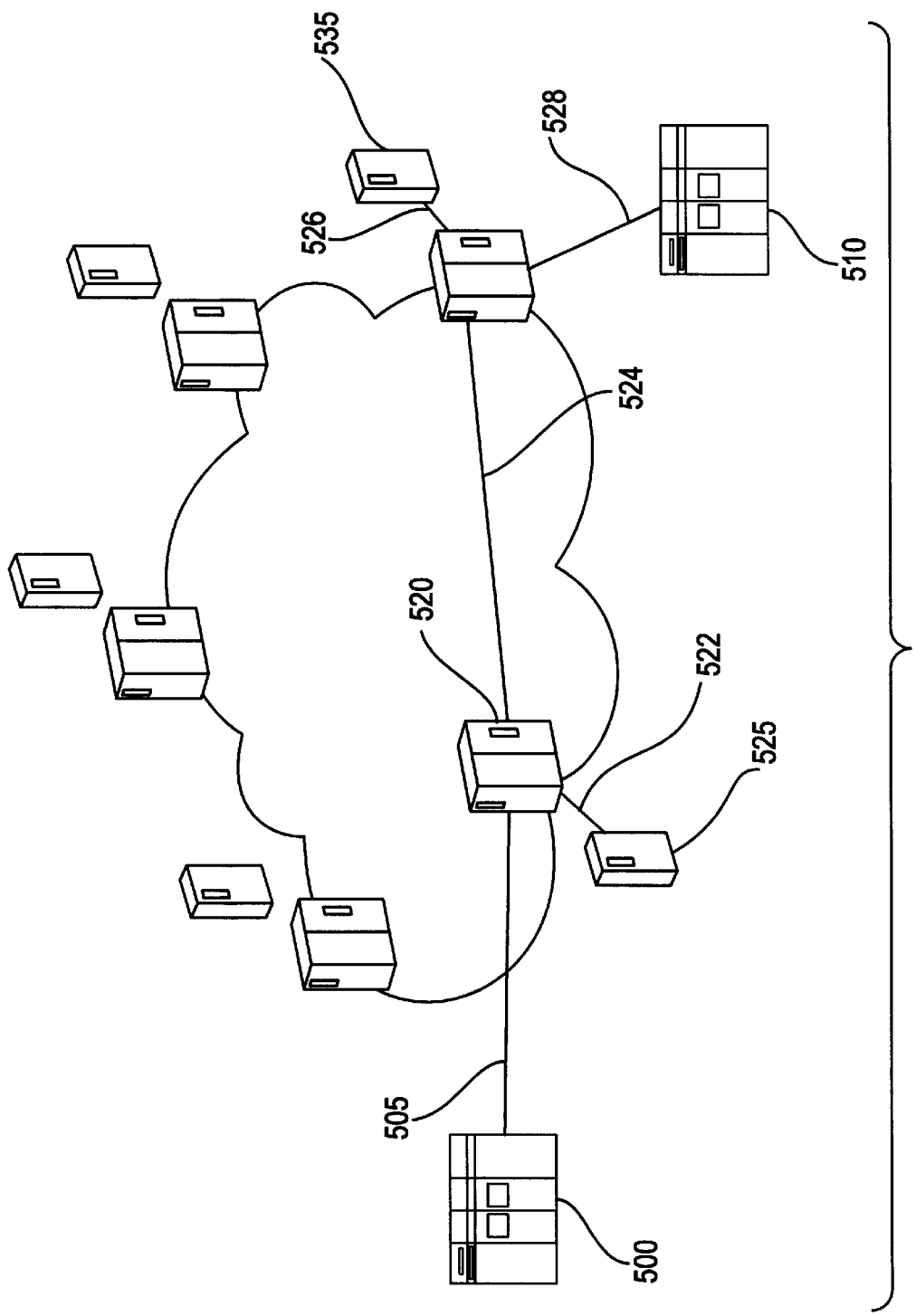
FIG. 5(a) shows the establishment of an IP-o-ATM connection between a source and destination according to our inventive teachings.

Our inventive concept and method for forwarding/routing IP packets becomes clear with simultaneous reference to FIGS. 5(a)–(c). Our method relies on the fact that since ATM uses a "link-by-link" VC mapping as it proceeds through connection setup, we can assume that each node owns the VC space on its downstream link and can simply route a flow without regard to the downstream links, assuming that is that no end-to-end QoS guarantees are required for this particular flow.

In the case shown in FIG. 5, we can assume that VC mapping for link 505 is done by Source Node 500 and that VC mapping for link 524 is done by ATM Switch 520. With data-driven IP flows, upstream and downstream directions are relative to a flow. For a given link therefore, a particular VC may be selected by one end-point for a given flow and the same particular VC may be selected for another flow in the reverse direction. This poses no problem since it is assumed that there is no bidirectionality for connectionless IP traffic and that the transmitter and receiver mappings can be different for the same VC in each different direction.

On each of the ATM switches 520 and 530, a port exists which is connected to an individual IP router 525 and 535, respectively. Note that this assumption does not require that there be a physical link to an IP router on each and every ATM switch, only that there is a port on every switch that has access to an IP router. In such a case when there an IP router is not physically connected to every switch, some minimal coordination is needed between the ATM switches to establish a default route.

When the ATM switches are initially setup, and as shown pictorially in FIG. 5(a), all unknown VCs in a VP/VC routing table are routed to the port of the switch that has access to the IP router. Consequently, when a connectionless IP packet arrives at the Source node, the Source node will pick an available VC from its pool and send it forward to the first ATM switch. Since the VC picked by the Source Node is unknown to the first ATM switch, this first ATM Switch will direct the connectionless IP packet received to the IP router it is connected to, for IP level processing (routed mode).

While the packet is being processed by the IP router to determine its next hop, any successive ATM cells associated with that packet are stored in a buffer particular to that VC. After a next hop is determined (in this case 524), the stored cells are redirected to an actual port with a new VC picked for link 524 by the first ATM Switch. Once the cells that are queued up are flushed, the VP/VC routing table in a Line Interface Card connected to Link 505 is set with the appropriate port number/VP/VCout for that connection (switched-mode). The first ATM Switch will subsequently forward the packet to the next hop IP router by picking an unknown VC on its link 524 and completing the VP/VC table contained at its input line card. All successive IP cells on that VC will now bypass the IP router 525 and be directly cell switched (switched mode).

Those skilled in the art will recognize that the data buffering on a per VC basis can be done either in the router port or on the line interface card itself. This data buffering results in a connection that can be maintained as long as IP packets are flowing in a session and torn down if a certain number of IP packets do not arrive on this VC for a specified time.

At this time a few noteworthy points about our method become apparent. First, every IP connection starts in a routed mode and is subsequently converted to a switched data mode after the first packet is processed. Second, using the same VP/VC for successive packets guarantees a switched mode transport, therefore these successive packets are not processed by IP routers in the path. Third, and unlike prior-art approaches that require coordination between neighboring switches before changing from routed mode to switched mode, there is no overhead when moving from the routed to the switched mode with the present method because no coordination is required between adjacent switches. Finally, our method allows both native ATM and IP stacks to co-exist on the same ATM switch. This is due in part to the fact that our unused VP/VC method allows the ATM stack to use co-ordinated VC setup and the IP stack to use uncoordinated setup with no potential race conditions. Since the ATM setup needs two way handshakes before the VC selection, there is no conflict as the IP setup will have priority over the ATM setup in terms of VC selection. That is, if the ATM module picks a VC that is already being chosen by its upstream neighbor for an IP flow, it will necessarily choose another VC.

Our basic method results in at least a 7:1 savings over the prior art in terms of packet processing at the switch controller and allows the ATM and IP stacks to work in harmony over the same ATM hardware, because there is no coordination required between switches to set up a SVC. Despite these measurable advantages over the prior art, our basic scheme has one minor drawback however, that once a flow has been switched, the IP processor does not process any subsequent control messages. Additionally, our basic scheme requires VC timers to idle VCs out. That is to say, the IP soft-state needs to be performed at the ATM cell level. Advantageously, all of these these potential drawbacks are overcome with our enhanced method which we call IPSOFACTO.

To keep a flow in the routed mode messages associated with that flow (control messages for example) need to be sent over either a PVC or a new, unknown VP/VC for the message. Alternatively, the message may be sent on the same VP/VC but as an operations, administration and maintenance (OAM) cell. The former is preferable if one has distinct control messages like prune/join from multicast flows which are not in the data flow. The latter conditions are suitable for those situations having flows in which the control packet dictates a new set of conditions that the data packets must adhere to or expect from the network.

RSVP messages are exemplary of messages that typically come in the latter set where an exploratory PATH message is first sent from a source node to a destination node and data is then sent back to back from the destination to the source with this message. This model is best characterized as a flow dynamic renegotiation with control preceeding data. Of these two latter approaches, the unused VP/VC space approach to start a control switch in the middle of an application has the benefit of simplicity however it relies on a soft-state to tear VCs down and may excessively use VC space.

For the enhanced IPSOFACTO protocol we prefer embedded OAM cells to send all control messages on the routed path while keeping the data messages on the switched path. The inherent advantages of such a scheme will become readily apparent to those skilled in the art. Specifically:

1) No segmentation and re-assembly is required of an entire IP packet for control action.
2) A natural match to the IP data driven flows where control information typically sets up the condition for the data packets following it, i.e., RSVP.
3) Native TCP setup and tear down without relying on ATM signaling or soft-state.
4) IP protocols with periodic refreshes can maintain soft-state at the IP level instead of relying on cell level activity counters which result in inefficient hardware implementations as well as processing complexity.

5) It provides a natural framework for all enhanced ATM applications using in-band control. Applications such as native IP applications (RSVP, IP multicast, mobile IP, TCP etc.), Video On Demand, ABR control etc., can be solved utilizing a unifying OAM framework.
6) Implementation benefits of a skinny fixed-length protocol to handle IP as opposed to a variable length format.

With reference now to FIG. 6, there it is shown how our enhanced IPSOFACTO method operates. Specifically, when SRC 600 has an IP packet to send to DEST 610, the first (n) cells 615 are sent as OAM cells on an unused VP/VC 617 via routed path 607 The routed path proceeds from the SRC, through a first switch 620, through a first IP router 625, back to the first switch and on to a second switch 630 where it is similarly looped through a second IP router 635, back through the second switch and on to the DEST 610.

For most IP applications, only a one cell OAM message is needed for IP routing (IP src, dest and TTL) while some applications like RSVP will need multiple OAM cells. All data cells 619 are sent on the same VP/VC via switched path 609. If subsequent control cells 621 are needed, they are sent as OAM cells in the middle of a session. For multi-cell control messages, it is advantageous to define two OAM cells. The first OAM cell signals to move all future data cells to the routed path while the second OAM cell signals to move all future data cells to the switched path.

The IP packet can be left untouched by injecting an OAM cell before the IP packet which encapsulates routing information or by sending the first cell of the IP packet as an OAM cell and the rest of the packet as data cells. While there are implementation and performance ramifications of both approaches, they are functionally equivalent.

Setting up and controlling switched paths is done using "inferred" IP signaling. This approach allows the reuse of a wide-array of existing IP protocol software with minimal modifications. Additional ATM hardware and software features are reused as much as possible with our IPSOFACTO method. This includes using ATM level hardware multicast for IP multicast as well reusing PNNI topology tables for routing and using UPC policies and CAC for RSVP.

Of particular importance at this point are the underlying principles to our inventive method. In particular ATM serves as the "binding" for our multiprotocol method. As described above in the context of IP, this binding involves a "myopic" hop-by-hop setup between nodes with no explicit signaling exchanged between the nodes. As can be readily appreciated, this is a "natural" fit for hop-by-hop protocols such as IP.

To effect this binding on the ATM infrastructure, and unlike the prior art, our inventive method does NOT require that a VC be treated as a shared network resource. As a local resource, the VC is assigned and reclaimed at a particular node independent of that VC assignment/reclamation at other nodes. Neighboring nodes are not informed, and have no need to know about VC assignment/reclamation at neighboring nodes. Consequently, the VC acts as a binding from a static, global IP address to a local, dynamic address.

Advantageously, IPSOFACTO allows interoperability with other methods and protocols. Connection-oriented traffic running on native ATM will go through a setup phase using the control channel and VC assignment will not affect VC assignment for the IP traffic as long as aforementioned procedure is followed. Thus both the ATM and IP stack will run seamlessly over the same framework.

At this point it should be apparent to those skilled in the art that our inventive method is "protocol independent" and while our discussion to this point has been focused on IP over ATM, it could quite well be extended to alternative protocols as well, namely IPX and or Frame Relay protcols.

Specifically, the Internetwork Packet Exchange (IPX) protocol was adopted by Novell from the Xerox Network System (XNS) Internet Datagram Protocol. IPX defines:
Internetwork addressing as the address of a segment on the network, identified by the network number assigned during installation.
Intranode addressing as the address of a process within a node, identified by a socket number.

IPX is a datagram-based, connectionless protocol. As should be apparent by now, datagram-based, connectionless protocols do not require an acknowledgment for each packet sent. Packet acknowledgment, or connection control, must be provided by protocols above IPX.

The basis of IPX addressing is the network number assigned during the installation and configuration process. Each network segment on a NetWare internetwork must be assigned a unique network number (sometimes called the external network number). Similarly each server on the network must also be assigned a unique internal network number. As with IP, these network numbers are used by routers to forward packets to their final destination segment.

The Sequenced Packet Exchange (SPX) protocol works with the Internetwork Packet Exchange protocol (IPX) to provide reliable delivery. SPX guarantees that packets are received intact, in the order they were sent, and eliminates duplicate packets. IPX receives packets from the network, and passes on those that SPX should handle. SPX requests verification from the destination module for each packet sent. By checking a verification value agaianst a value calculated before transmission, SPX ensures that the packet arrives intact. In the case of a missing packet, the transmitting SPX module retransmits, and continues to do so up to a program-specified number of retries. SPX does not provide group broadcast support; packets can only be sent to a single session partner. SPX has provisions for detecting if a session partner has disappeared. Importantly, with our inventive method, binding an IPX address to a VP/VC is the same as binding an IP address to a VP/VC.

Frame Relay is a high speed data transport method that is used to economically connect users in dispersed locations. Frame relay is based on the Link Access Protocol-D (LAPD). It establishes a direct link between the sender and recipient for the length of the transmission and transmits data as a series of variable length packets, each having a circuit number that identifies its source and destination address. Similar to other protocols described previously, binding frame relay packets to a VP/VC is straightforward with our inventive method and may be performed using the same connection oriented principle as with ATM. Namely, using Q.2931 as a signaling channel to set up the SVC or by using direct DLCI to VP/VC mapping to set up a hop-by-hop SVC with IPSOFACTO.

Peek and Reserve Protocol (PRESERVE)

Figure 7A:
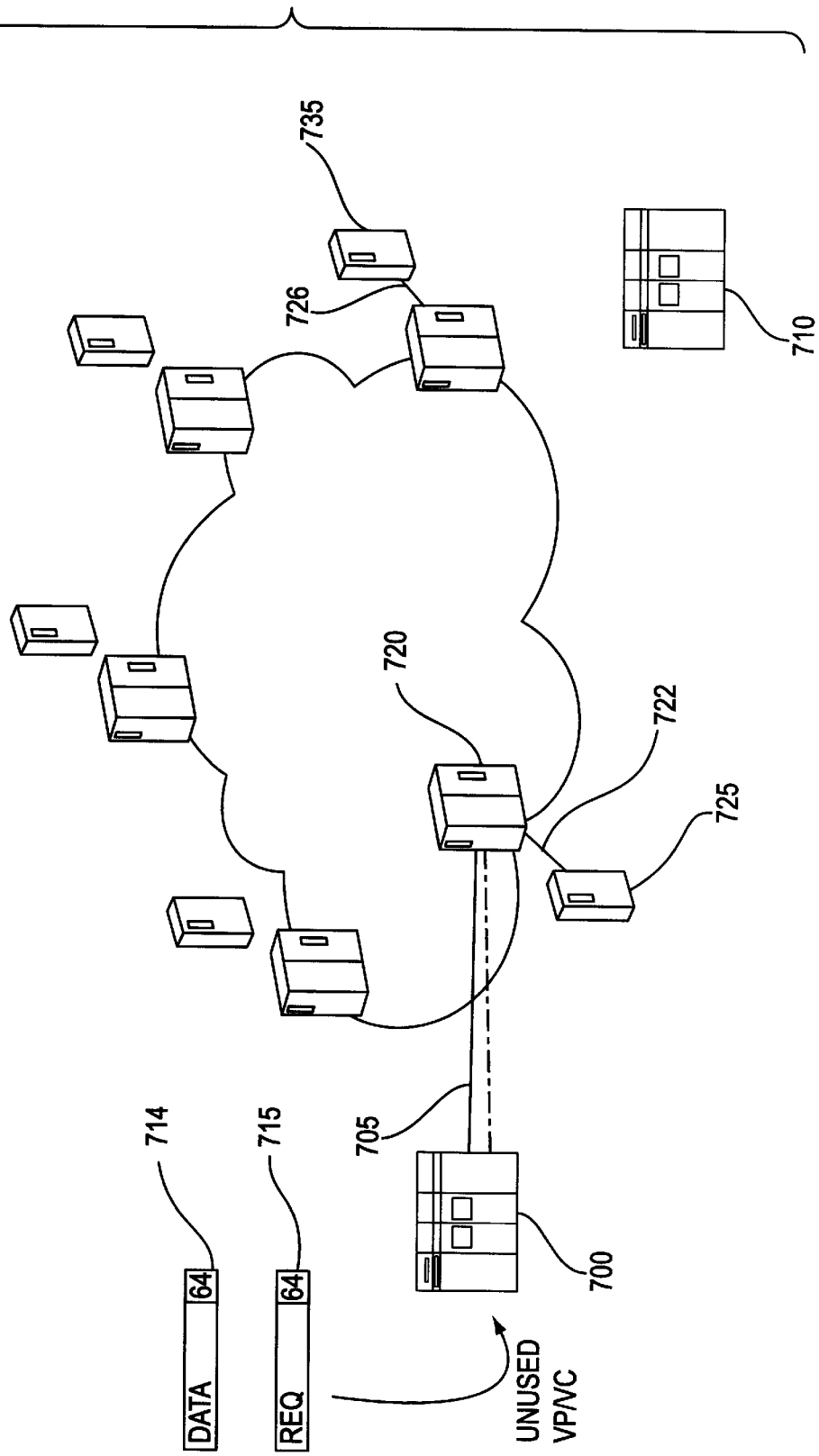
FIGS. 7(a)–(b) show the operation of our enhanced IPSOFACTO method of FIG. 6 supplemented by our peek and reserve (PRESERVE) method.
Figure 7B:
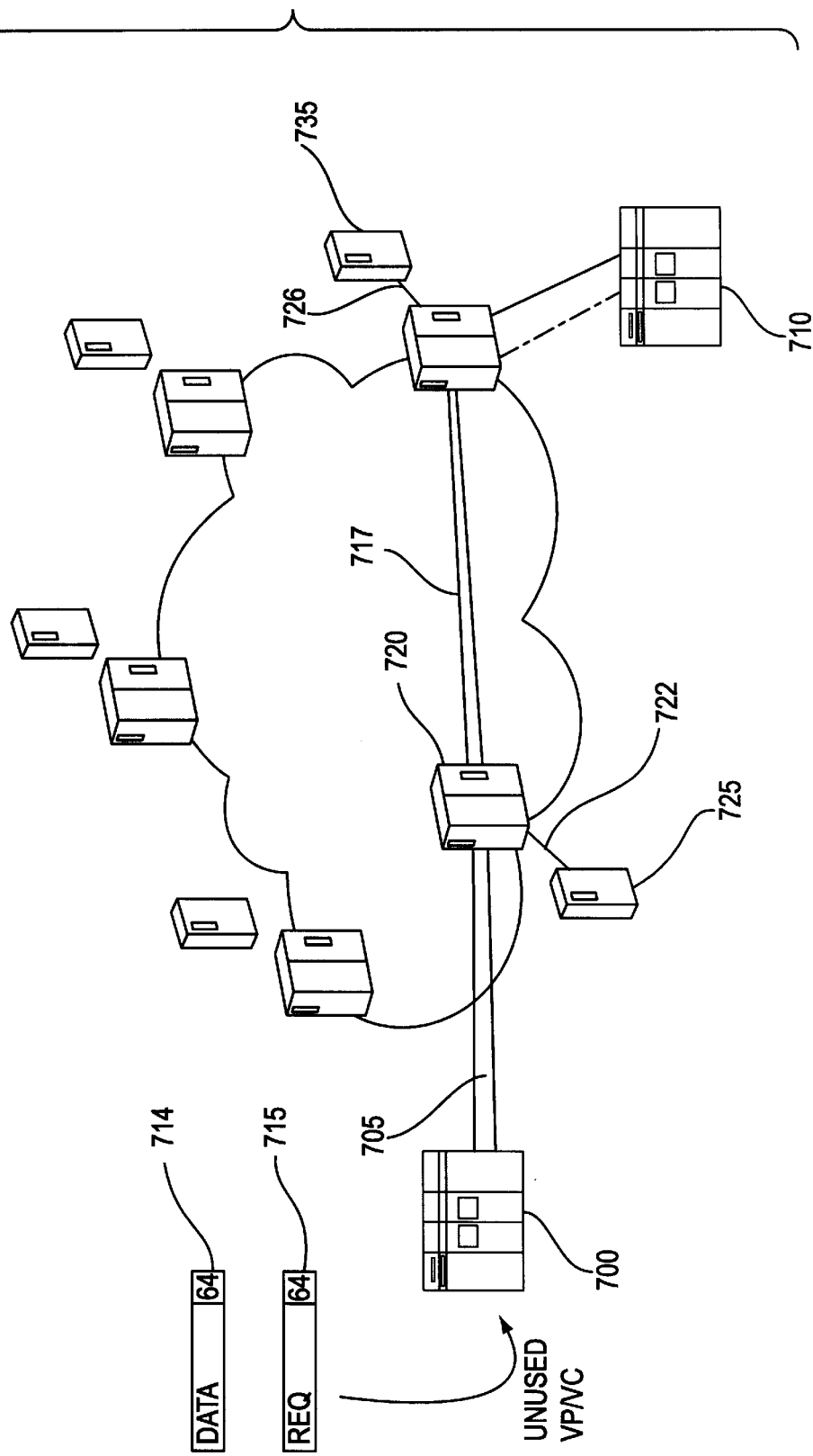

For applications such as Network File System (NFS) which utilize UDP or a sparse mode PIM, our method advantageously incorporates a peek and reserve protocol. Specifically, and with reference now to FIGS. 7(a) and 7(b), as a request 715 traverses the network on a routed path from SRC 700 to DEST 710, IPSOFACTO creates a switched path in the reverse direction. Each of the forwarding switches 720, 730 uses a VP/VC that it has created in the switched direction to carry the request forward. The DEST is therefore instructed to send data in the reverse direction using the VP/VC it receives the request on. As a result, the bi-directional switched path is created even before data 714 starts flowing. Advantageously, this procedure minimizes data buffering at the switch controller when IP routing decisions are being made.

Figure 7C:
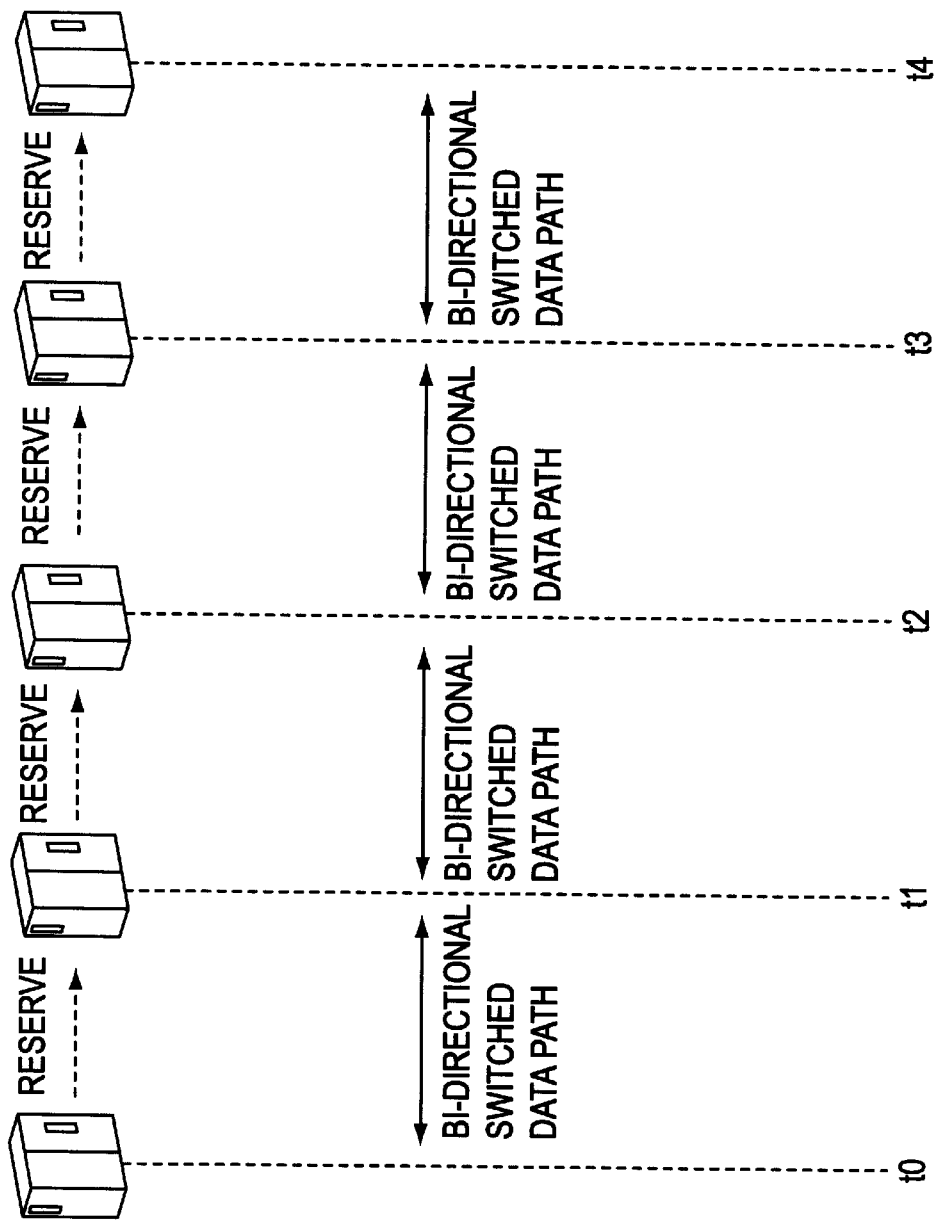
FIG. 7(c) shows the establishment of reverse switched paths in a network at VC establishment according to the method of FIG. 7(a)

With further reference to FIG. 7(c) a call flow for the above PRESERVE protocol is shown. Specifically, SRC 700 initiates the establishment of a circuit from the SRC to DEST 700. Such an establishment is initiated by the issuance of a RESERVE message which traverses a network connecting the SRC and DEST. In this example, three switches, are interposed between the SRC and DEST. As the RESERVE message traverses the network it is received by and subsequently forwarded by the switches at different times respectively.

Upon receipt of the RESERVE message by each of the respective switches, a switched path is established in a reverse direction to the direction of the RESERVE message. That is, and as is shown in FIG. 7(c), at time =$t_1$, a switched path is established between the first switch and SRC. Similarly, at time =$t_2$, a switched path is further established between SRC and Switch 2, via Switch 1. This process continues through all intervening switches in the path until a complete bi-directional switched path is established from SRC to DEST at time =$t_4$. As those skilled in the art will readily appreciate at this point, it is very advantageous to establish this hop-to-hop, bi-directional switched path at the same time the RESERVE signaling message initially traverses the network.

IP-Traffic Classification and semantics-based control

In order to understand fully the issues associated with transporting IP traffic over an ATM network, an overview of the type of IP traffic encountered with different applications is useful. Generally speaking, IP traffic may be classified as follows.

Pure data with no signaling

Examples of this classification are UDP packets such as ping requests/responses or ICMP. These packets do not benefit from being switched since they are part of a single packet flow. However, if the switching is done in a manner that times out after some elapsed time and subsequent traffic is moved back to a routed path so that any next packets on this link arrive on the routed path, no penalties are incurred. One option then is to map this IP packet to a new VP/VC everytime and let the old connection expire. If VC reuse is of prime importance then it is possible to send an IGMP message (which only goes to the next hop) on an unused VP/VC but not identify it as used, i.e., use it and return it back to the unused VC space immediately.

Infer signaling from the IP packet

For example, UDP-based NFS traffic which is transaction oriented. One gets an UDP request in one direction and data in the other direction. Routing should be done in one direction and switching in the other direction.

Signaling Packets separate from Data Packets

All TCP based traffic including web traffic falls into this classification. In the case of TCP signaling packets there is no periodic refresh because the state is maintained at the endpoints. In this situation all of the signaling packets traverse the routed path while the data packets traverse the switched path as soon as that switched path is established. In the case of TCP, a SYN packet is used to setup the switched path and a FIN packet is used to teardown the switched path. The unidirectional flow characteristic of this scenario allows one TCP connection to be on in one direction while torn down in another direction.

Signaling Packets separate from data packets with periodic positive refreshes

Examples of this classification are Protocol Independent Multicast (PIM). The general philosophy utilized with this class is to force all of the signaling/refreshes through the routed path and let the data follow the switched path. Signaling sets up the data path.

Signaling Packets separate from data packets with periodic negative refreshes

An example of such a class is DVMRP based IP-multicast signals, i.e., prune and forward. As before, signaling/refresh messages go through the routed path and let the data follow the switched path.

Signaling packets separate from data packets with periodic refreshes and resource reservations RSVP-based messages like PATH and RESV are examples of this classification. In this classification the signaling messages follow the routed path and switch based on the signaling messages for the data packets. The signaling messages and the data messages will be on the same VP/VC with the refresh messages being sent as an OAM cell to be routed to the IP router.

With these classifications in mind, the general trace of an IP packet may now be described. First, the default path taken by the packet is the routed path. A packet will be inspected at the IP router and then classified according to the above described classifications. Subsequent to the classification, it is changed to the switched mode.

Traffic monitoring is done at the IP level. The switched path is eliminated when particular protocol messages arrive on the routed path (i.e., PRUNE, FIN etc.) with softstate implemented at the IP level. For TCP flows, the TCP handshake protocol (SYN, SYN-ACK and FIN) may be captured and evaluated to set the connection up or conversely tear it down.

Those skilled in the art will quickly recognize that the setup time TCP traffic is shortened in our scheme as contrasted with the prior art. Additionally, our inventive method allows situations to exist where a TCP session is torn down in one direction but still continues in the other direction. We call this situation TCP half-close, which has a natural fit to certain common applications like rsh and web browsers such as Netscape.

IP Multicast

Unlike prior art methods, IP Multicast situations and their associated protocols are advantageously accommodated with our inventive method. There are three common protocols for IP multicast. They are: 1) Distance Vector Multicast Routing Protocol (DVMRP); 2) Multicast OSPF; and 3) Core-based trees (CBT).

Distance Vector Multicast Routing Protocol is widely used on Mbone. By way of background, the worldwide multicast backbone (Mbone) is presently an experimental service that is being used to develop IP multicast software and services. This experiment provides digitized audio and video applications, as well as whiteboards, a radio channel, etc. Mbone uses source specific multicast trees and is closely coupled with the underlying unicast routing protocol (RIP). It is useful for groups having dense membership and in situations where bandwidth is plentiful (LANs, MANs). Multicasting is not connection oriented in IP multicast. A multicast datagram is delivered to destination group members with the same "best-effort" guarantees as unicast datagrams The only difference between a multicast datagram and an unicast datagram is the presence of a group address in the Destination Address field in the IP header. Multicasting employs a class D destination addressing format (224.0.0.0-239.255.255.255).

Multicast OSPF (MOSPF) uses the OSPF unicast routing protocol (link-state) instead of RIP. This protocol is not widely used, but is attractive because it shares the same underlying unicast routing protocol as native ATM, namely PNNI.

Core-based trees (CBT): uses a shared multicast tree for the group. The common root of the group is called the Rendezvous Point (RP). Independent of the underlying routing protocols, all multicast packets are transported as encapsulated unicast packets along the tree. Tree nodes send explicit join messages to the RP whose unicast address needs to be known explicitly. CBT works well for sparse groups with bandwidth limitations (WANs).

The Internet Engineering Task Force (IETF) has recently combined CBT and DVMRP into PIM (Protocol Independent Multicast) which uses two modes: DVMRP for dense mode and CBT for sparse mode. PIM-dense has eliminated the coupling with the underlying unicast distance vector routing. A receiver initially joins a group by joining the shared tree (rooted at RP) and then switches to one or more source-specific trees.

With these protocols in mind, we can now discuss how IP multicast situations work with our inventive method. In the first situation, the IP protocols are run independent of the native ATM protocols. In the second situation the underlying unicast ATM routing protocol (PNNI) is reused for topology acquisition and the multicast IP is run on top of that.

IP Multicast over IPSOFACTO using DVMRP

In current DVMRP over ethernet implementations, a group membership protocol (IGMP) is run on a Designated Router (DR) situated on the ethernet and learns about group members that are directly attached to it. It multicasts a query on a specific group, i.e., the all hosts multicast group (224.0.0.4) to determine if there are receivers for any multicast address groups. The periodicity of this query is short, generally every 5 seconds. Each receiver for a group (say 225.0.0.1) sets a local timer and the receiver whose timer resets first sends a response on 225.0.0.1 with TTL=1. This response is received by all members of the group and also the router (who listens to all multicast addresses) which ensures the group's refresh at the router. If no response is received on a given group after a certain number of cycles, the router removes the group state. Additionally, each receiver sends a join request as soon as it desires to join a group without having to wait for the next query.

Using IPSOFACTO, IGMP is mapped onto a Logical IP Subnet (LIS). For the sake this discussion, assume that the LIS is an ATM switch having directly connected endhosts. If multiple ATM switches will comprise a LIS, all unused VP/VCs (or a set of allowable ones) are mapped from switch to switch to flow towards the LIS (routed path) and then reconfigure the data path from switch to switch. This may minimally require some Network-Network Interface (NNI) support, i.e., remapping the VP/VC table at the line interface card in any intermediate ATM switches that do not have IP support.

In the LIS a PVC is configured to map the all hosts multicast group to a one to many ATM multicast with the DR on the module in the switch running the IP multicast. A PVC was chosen for this group because it is persistent and acts as the control channel within the LIS. Using our inventive method, the IGMP protocol is mapped as follows.

1. A query is periodically sent from the switch on the all hosts one-to-many ATM multicast. Along with this query, IP-multicast ATM 1-2-m mappings are sent for groups currently active.
2. A receiver responds to the query. If a group specific ATM multicast channel exists then it is used for the response. If no such group specific ATM multicast channel exists, the response is sent on the all hosts one-to-many ATM multicast channel.
3. When a host joins the group (say 225.0.0.1), as a receiver it picks up a random VP/VC from its pool and sends an IGMP response which gets trapped by the switch.
   If the receiver is the first one it installs soft state:
   225.0.0.1:portx/vpiy/vciz
   else we augment the existing state:225.0.0.1:<existing port/vpi./vci mappings>+ portx/vpiy/vciz.

Note that this hardware multicast is performed within the switch fabric and the mapping onto the VP/VC table will depend on the specific switch implementations. In the case of one particular ATM switch which uses a cell forwarding mechanism with address filtering at the outputs, this will translate to a new bit-mapped address to be generated for cells for this group.

In the case of ATM each receiver needs to refresh the state of the group as all the receivers do not share the data path. Nevertheless, the router can filter out multiple refresh messages by a hardware modification made to its routing tables. In particular, a bit is set for each multicast group when the first refresh message arrives. All successive refresh messages for that group are ignored until a timer expires for the softstate. Upon the timer expiration, the bit is reset.

In general we specify one control VC from each host to the router and one data VC that emanates from one sender to multiple receivers. Specific optimization on this method can be achieved if VC-space is limited, but with 64K potential VCs per link, such a problem is unlikely.

The sending protocol is simple and straightforward. A sender sends an IP datagram on an unused VP/VC. A switch then traps that datagram and upon inspection of the multicast address determines a set of receivers/ports that it (the datagram) needs to be forwarded to. The switch then reconfigures the VP/VC table at an appropriate switch port thereby identifying the multicast.

For the multipoint to multipoint case, a point-to-multipoint VC is opened for each source on the multicast tree. Advantageously, this operation is natural to both IP multicast routing (Source,Group) and cell level ATM multicast. With an ATM switch having a Time Division Multiplex (TDM) bus with address filtering done at output ports, this operation imposes no overhead.

Figure 8:
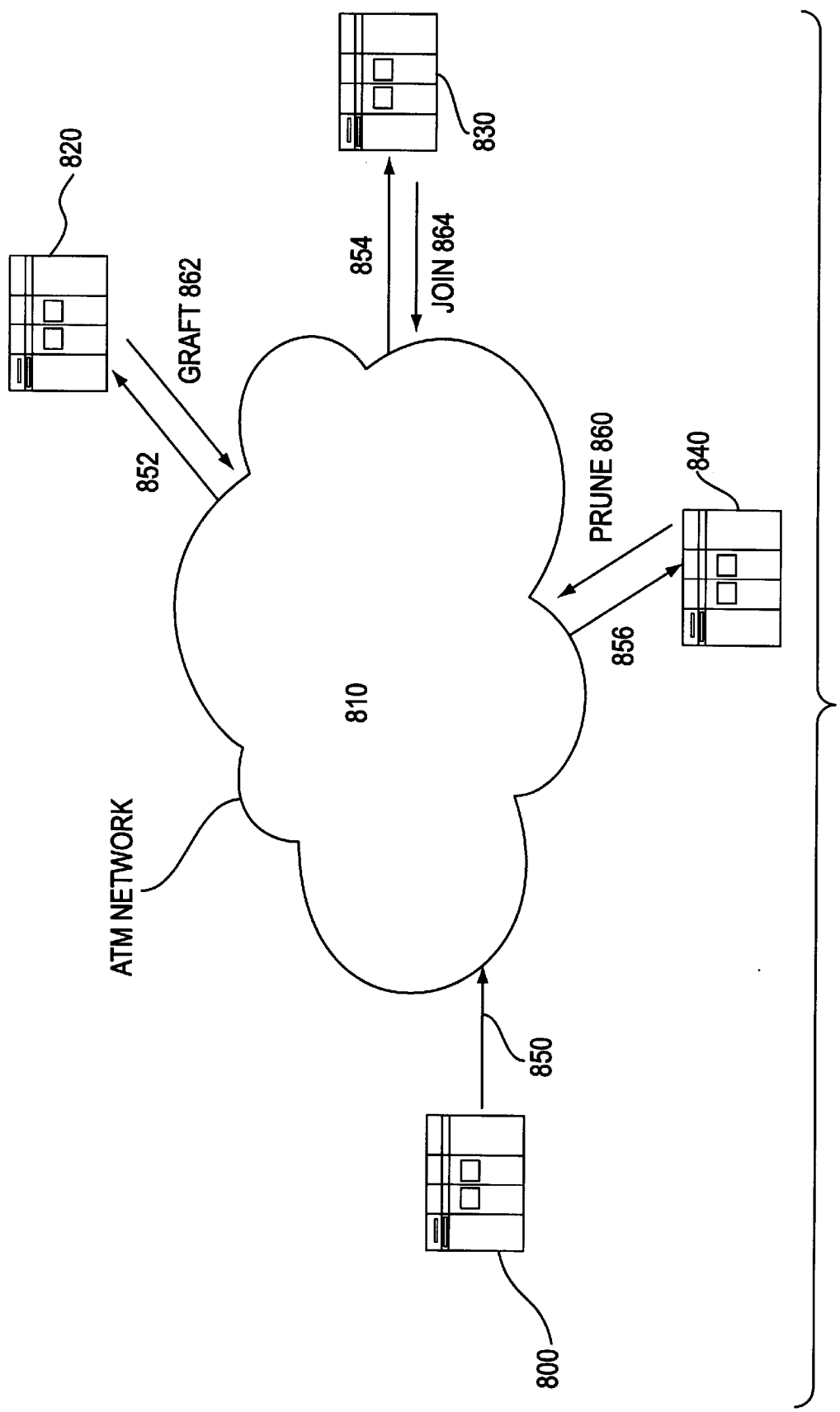
FIG. 8 shows an IP multicast application utilizing ATM transport according to the teachings of the inventive method.

FIG. 8 shows a multicast scenario between a SRC 800 and multiple RCVs' 820, 830, 840 each connected to an ATM switch in the ATM network 810, with each switch, in turn having access to an IP router. With such an implementation, control messages (PRUNE, GRAFT, JOIN, etc) are sent on a routed path, while data transmitted between the SRC and each of the RCV nodes is sent over a switched path. Advantageously, this method preserves the scaling and dynamic flow properties of IP multicast protocols while exhibiting simple, direct mapping of IP multicast semantics (Sender, Group) to underlying ATM switch hardware.

Inter-router/inter switch forwarding

Inter-router/inter switch forwarding is accomplished with our method utilizing the same basic infrastructure as before where all default VCs point to a nearest IP router. This involves an IP overlay network situated on top of the ATM and is created by next-hop IP routers in communication with one another. The packets that travel on this IP network are in the routed path (default path), any remaining packets go through the switched path and do not involve IP processing.

DVMRP operates by sending the first data packets on a broadcast tree rooted at the source. That tree is dynamically created. If a packet arrives on the shortest reverse path to the source, it is forwarded to all outgoing links. If the router receives a prune(source,group) message from a downstream router, it sets a don't-forward (source, group, link) flag for the (S, G) entry. This is a timer-based flag so once the timer expires, the don't-forward becomes forward (soft-state with negative refreshes).

IPSOFACTO Implementation of DVMRP protocol

Figure 9:
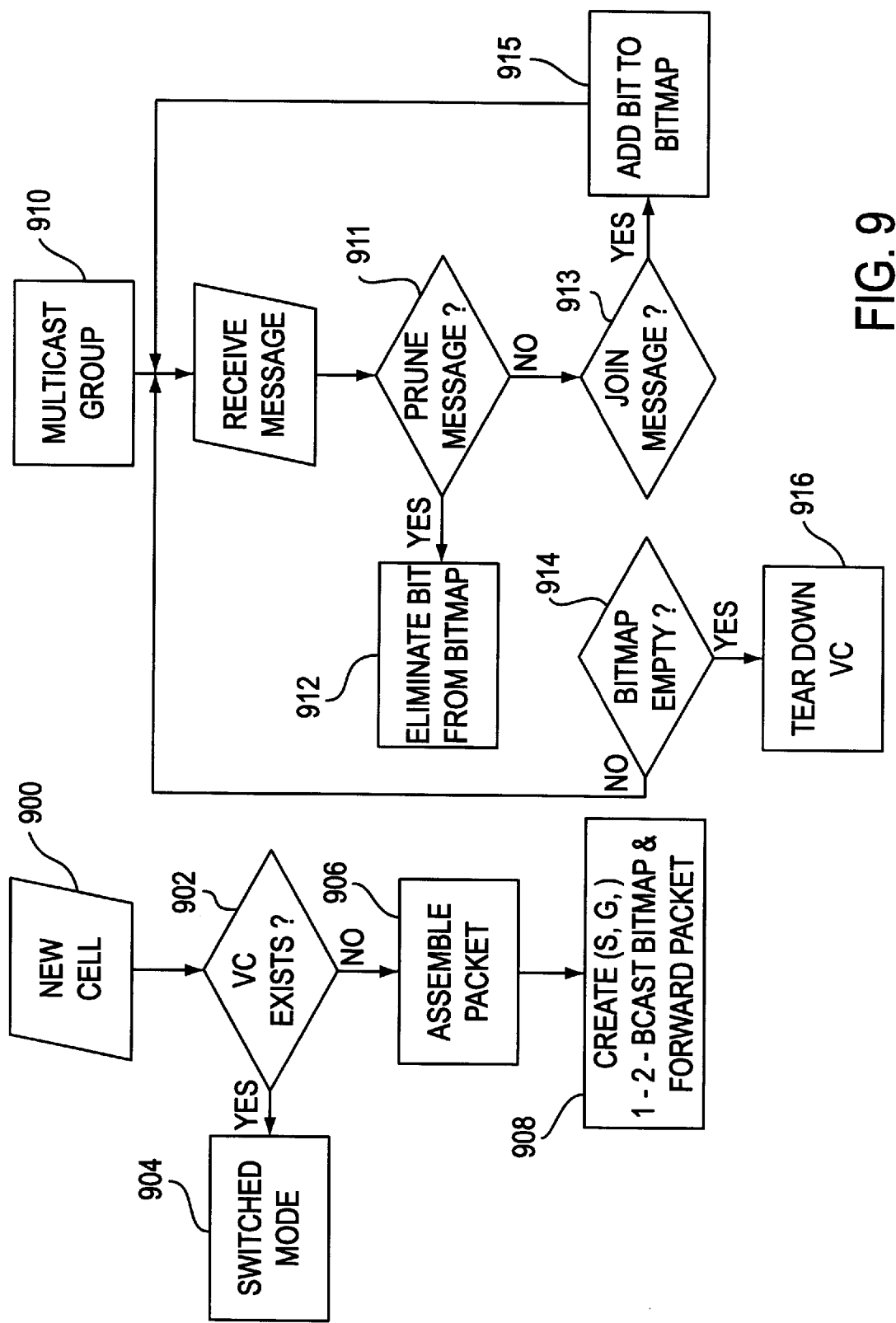
FIG. 9 is a flowchart showing DVMRP operation according to the present invention.

The IPSOFACTO implementation of the DVMRP protocol in shown in FIG. 9. Specifically, a new cell is received by a node 900, a determination is made whether a VC exists to transport that cell 902. If so, the cell is transported via a switched mode 904. Alternatively, when no VC exists, a packet is assembled 906. Subsequently, a 1–2 bcast bitmap is created and the packet is forwarded to a next node 908. When a PRUNE message 911 is received which specifies a multicast group 910, a bit contained within a bitmap is cleared 912. Such PRUNING may continue until every bit in the bitmap is cleared. When all of the bits are cleared and the bitmap is empty 914, the VC is torn down 916 and the entire process may continue again. Conversely, when a JOIN message 913 is received which specifies the multicast group, a bit contained within the bitmap is set 915.

Any prune/forward messages travel on an overlay IP network (routed path). For downstream routers that do not prune, the upstream router picks up an unused VP/VC and forwards the datagram to the downstream router. The source-specific multicast flow is then switched if it is not pruned.

When a router receives a packet that has local receivers, the router changes the forwarding entry from input port: {control port/vp/vc}→output port: {list of output ports/vp/vc} to input port: {source port vp/vc}→output port {list of output ports/vp/vc}. Advantageously, this may be performed using one-to-many multicasting inherent in the switch fabric. This works as long as we have one source and many receivers for each VC entry. Note that the prune/forward messages go on a separate control VC which goes to the router while the data messages always flow to the router first and then get switched as soon as the tree is extablished. It should be noted at this point that the coordination-less SVC setup allows a natural mapping to an IP multicast router without any steady state or transient conditions.

Shared Trees

With shared trees, tree creation is not data driven. A leaf router with group members, explicitly sends a join message towards the RP. Senders may piggyback data packets along with their join requests to the RP. In essence, there is a many to one path from the senders to the RP and a one to many path from the RP to the receivers. The receiver tree is set up independently of active data users and is also refesh/soft-state based.

IPSOFACTO Implementation of Shared Trees

Figure 10:
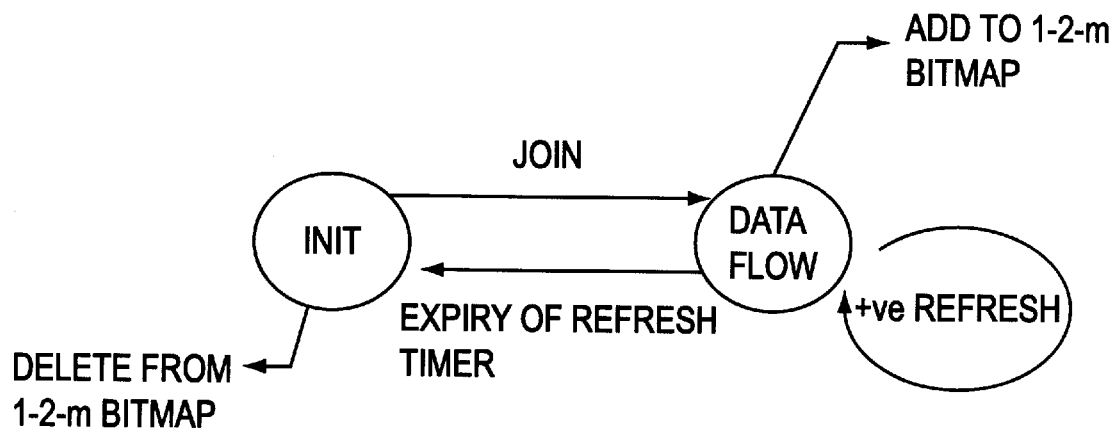
FIG. 10 is a state diagram showing a multicast according to the present invention.

The IPSOFACTO implementation of Shared Trees is shown in FIG. 10. Specifically, join messages are sent in a usual manner. Default VP/VC to point to the next IP router which forward the message towards RP. Additionally, the router can inspect the messages and create a switched receive path as the join messages traverse the tree. Before the data has arrived, we use the mapping of one to many trees from the RP to the receivers. Since the RP sends data packets without cell interleaving there will be no interleaving problem at the receiver.

For the path from the sender to RP, the register message is sent as an unicast message so the routing modules can set up switched path from the source to the RP as the packet is forwarded. This results in a switched path from the sender to the RP. From the RP to the receivers however, the whole packet can either be reassembled and resent, or alternatively, we can cell interleave using an appropriate AAL at the receiver to put it back together (AAL ¾ with the MID value is an option). The positive refresh scenario to build trees is illustrated in FIG. 8.

Multicast IP/PNNI Extensions

In the above discussion it was assumed that IP multicast routing will be run on top of ATM hardware—independent of the ATM routing. However, it is possible to reuse the existing ATM routing protocol (PNNI) for the route selection without invoking PNNI signaling for route reservation. Since MOSPF uses the same underlying link-state protocol as PNNI it would be instructive to see how MOSPF works and then show our inventive modifications (if necessary) to PNNI which make it suitable for IP multicast.

In MOSPF, each designated router advertises any groups present on its links to all other routers within the link-state domain. Thus, each router has topological information about which groups are present and on which links.

When a packet arrives at the router, it creates a shortest path tree rooted at the source whose leaves are multicast members. If the router is a node on the tree and the packet received on the reverse path then it either forwards it or drops it. The tree computation is done for the first packet and the entry is cached until a new link state update is received or no traffic traverses that path for a finite time.

In ATM, the same link-state topology exchange protocol exists and is hierarchical. So one option is to propagate the IP-multicast group membership for the local link as a part of the PNNI protocol exchange. This may be considered a layering violation but the topology/link-state exchange protocol is independent of the route computation IP-multicast routing should be supported "native" and in a peer-to-peer fashion with PNNI route selection except the fact that latter needs signaling and the former does nott. Consequently, our scheme for IP-multicast using PNNI topology acquisation scheme is summarized as follows.

When the first-hop router receives a (src,group) packet it computes the shortest path tree computation using the PNNI topology information. Since this information is hierarchical, the router will be able to compute the complete sub-tree undereath it and neighboring routers in the same peer group. PNNI uses source routing for its signaling so the entire path is forwarded in the signaling message in the existing ATM stack.

For IP-multicast the same procedure is performed with the addition that an entry point within a peer group computes a shortest path for forwarding multicast datagrams to all members within the group and its neighboring peers. However source routing is not used to signal the entire sub-path when the datagram is forwarded. The neighbouring peers compute their own sub-paths to do the forwarding and the branch routers in the hierarchy below the ingress router do the same. So instead of forwarding packets to all members on a sub-tree, the packets are only forwarded to the members on the hierarchy that are one below.

The IPSOFACTO implementation assumes a flat PNNI topology. The first-hop router receives the packet and computes a shortest path tree. For each outgoing branch it picks up an unused VP/VC on the port leading to the switch (next-hop router). It then creates a 1-2-m entry in its VP/VC table and starts soft-state on that VP/VC. The path is torn down if there is no activity for a period of time.

A problem with using the augmented PNNI approach (link state also contains group membership information) is that every change in the group members may trigger a flood of PNNI messages through the network. This is overcome in the hierarchical PNNI by updating group membership information only in a sub-domain and letting the rest of the network be blind to the actual members in each sub-domain.

Mobile IP

A requirement of mobile IP is fast setup and teardown of SVC's as the mobile moves. When applying our inventive method to mobile IP, two scenarios emerge, namely Mobile IP over mobility-unaware-ATM and Mobile IP over mobility-aware ATM. In the former, a datagram request is sent from the fixed host to a home agent which in turn tunnels the datagram to the mobile equipment. Specifically, the path from fixed-to-home is switched as described before. A home agent enters <inflow, outflow to foreign address> in its VC table. Note that the path from mobile to fixed is different than from fixed to mobile because there is no home agent involved in the former. Consequently, there will be two switched paths in such a case, both of which are unidirectional. A location update signal is sent on the control path to effect a switch from one VC path to another.

If the fixed host is mobility-aware, i.e., it can receive location updates, (route-optimization extensions in IPv6) then the above doglegged ATM circuit will time out after the fixed host sends packets using the mobile's foreign address (and setting up a switched flow to the foreign address). Consequently, if the fixed host is mobility unaware, then for fixed to mobile flows when the mobile is moving, the home agent will receive a location updatefrom the mobile via a default IP PVC. Note that it is not necessary to transport this update over a switched path because the total number of packets for the update will not be a very large number.

At this point, the home agent will now: 1) remove any existing <inflow, outflow> vc entry; and 2) add an <inflow, newoutflow> vc entry. Cells on the old outflow will be dropped unless of course one wishes for an hitless handoff. In this case one may need either mobile ATM support or some form of reliable delivery protocol at the ATM level. That is, each mobile IP router needs to hold packets/cells until an ACK is received thereby forcing the router to to flush them.

In the case of a Mobile-to-Fixed Flow: cells to the old switched path will hopefully reassemble to complete packets.
-new switched path created from mobile's new location to the fixed host
-if two paths intersect, cross-over point can do smart switching using <ip src, ip dest> as a connection id.
-at the crossover point replace <old inport, old outport> with <new inport, same outport>.
We illustrate this scenario (Mobile IP over mobility-unware ATM) in FIGS. 10a and 10b.

In those situations requiring route optimization, we begin with flow1 and flow2 and after we move we move to flow1' and flow2'. For flow1, the header will contain information about the home agent and the foreign address 1 and the payload will contain information about the mobile address at the homeagent, which does not change. If switch one can identify a location update message from MH after the move, then the switched path can be handed over to flow1' reusing the switched path from Home to Sw1.

In the case of flow2 and flow2', the header contains information about the src=CH and the dest=fal while the payload contains the encapsulated header (src=CH, dest= homeagent), which also does not change. A similar similar technique (reusing the payload fixed information about the src=ch and dest=home agent) can be used to switch from flow2 to flow2' at sw2.

Mobile IP over Mobilty-aware-ATM

In this situation, where there is mobility-aware-ATM, we let the original path be set up by mobile IP and then switched using the IPSOFACTO method previously described. When handoff occurs, however, the same mechanisms as were used with the mobile ATM handoff will be used to determine the crossover point and switch flows at that point. This requires that the mobile IP router as well as the mobile ATM module share the same topology tables that PNNI will produce.

RSVP

Resource ReServation Protocol (RSVP), is a protocol specially designed for integrated services Internet, which enables applications to set up reservations over the network for various services required. Currently the Internet architecture offers a very simple point to point delivery service, which is based on a best effort delivery model. In this model, the highest guarantee the network provides is reliable data delivery using protocols such as TCP. This is adequate for traditional data applications like FTP and Telnet, where correct data delivery is more important than timeliness.

Recently however, several new distributed applications such as video teleconferencing, video-on-demand and virtual reality have been developed which are affected by the quality of service they receive from the network. Therefore, before applications such as these are widely used, the Internet infrastructure must be modified to support real-time QoS and controlled end to end delays.

An extension of a traditional point-to-point delivery mechanism in which the sender takes care of reservations along the multicast tree gives rise to numerous problems. For example each time a member leaves or a new one joins in, it is the sender's responsibility to set up a new point to multipoint connection to the receivers. This reinitiation creates a huge overload when group membership is large.

A source initiated reservation cannot deal with heterogenous receiver requirements. For example, certain receivers may be using better hardware, or others may have low bandwidth paths to them. As the source does not a priori know about receiver specifications, it can only instruct a uniform level of reservation throughout the network. This may lead to unfairness and often cause wastage.

In contrast, RSVP is a receiver based model, where each receiver is responsible for choosing its own level of reserved resources, initiating the reservation and keeping it active as long as it wants to. In a way this is a distributed solution for the resource reservation problem, and enables heterogenous receivers to make reservations specifically tailored to their own needs.

RSVP is used by applications to request specific quality of service from the network. RSVP is not a routing protocol, but rather an Internet control protocol. Its task is to establish and maintain resource reservations over a distribution tree, independent of how it was created With RSVP, a typical flow begins with a PATH message being sent from a SOURCE to a DESTINATION, followed by data packets. In the PATH message, the sender includes information about the destination (flow spec) as well the traffic class and resources needed (Tspec). Additionally, the PATH message also includes an Adspec field in which each node on the forward path indicates the state of congestion of the switch, i.e., average delay over a set of time constants is typical.

When the the PATH message arrives at the receiving node, that node compares the delay expected on that path (Adspec) with the delay requested by the application (Tspec) and then transmits a RESV message on the reverse path. Each switch in that reverse path now "locks in" the request based upon its state. Importantly, RSVP is a softstate protocol so periodic PATH messages are expected to keep the flow alive and also bandwidth requests may be modified from PATH message to PATH message depending on the needs of the application. This scheme works particularly well for non-stationery sources such as video. Additionally, data flows are monitored at the packet level using a token bucket. This allows the requested rate flows to be transported as guaranteed traffic, while excesses flows are transported as best-effort.

Advantageously, RSVP flows are conveniently mapped to ATM Quality of Service (QoS) based classes. In fact ATM is one of the few technologies that allows RSVP to request resources and then fulfill those requests. Unfortunately however, present day ATM signaling does not support bandwidth renegotiation. Consequently, the mapping from RSVP to ATM using IP-o-ATM is not particularly efficient because each PATH message results in a new VC setup even when the additional bandwidth requested is a modest amount.

IPSOFACTO RSVP MAPPING

An RSVP flow begins with a PATH message being sent from a sender. Upon receipt of this PATH message by an upstream router, the upstream router picks an unknown VP/VC for this flow and sends it as an CAM cell. The message is intercepted and processed by the RSVP/routing module on the IP router port. Subsequently received IP packets are transported on the switched path except that particular service classes (CBR, VBR, ABR or UBR) are transported without guarantees. This is accomplished by marking all cells with CLP=1 bit and not making any resource reservations for the VC. Upon receipt of a corresponding RESV message in the reverse direction, the resources are locked in by invoking the CAC module. All subsequent packets on that flow are sent with CLP=0 and an appropriate equivalent bandwidth is allocated for that flow. If the switch hardware supports a leaky-bucket policer at the input we will also monitor the flow and mark excess traffic with CLP=1 before passing it through. This way we mimic the token-monitor in a packet based IP server using RSVP and Intserv. Those skilled in the art will quickly recognize that our method advantageously allows dynamic renegotiation of RSVP flows without assigning new VP/VCs or tearing connections down.

For the generic IP-multicast situation, RESV merges will need to be done in the routed path, which will create 1-2-m ATM multicast VCs with the appropriate resource reservation parameters as well as set token buckets for each VC at the line interface card for monitoring and marking excess traffic. PATH messages will be forwarded based on the IP-mcast routing protocol (Dense mode or Sparse mode PIM or PNNI-augmented).

Figure 11:
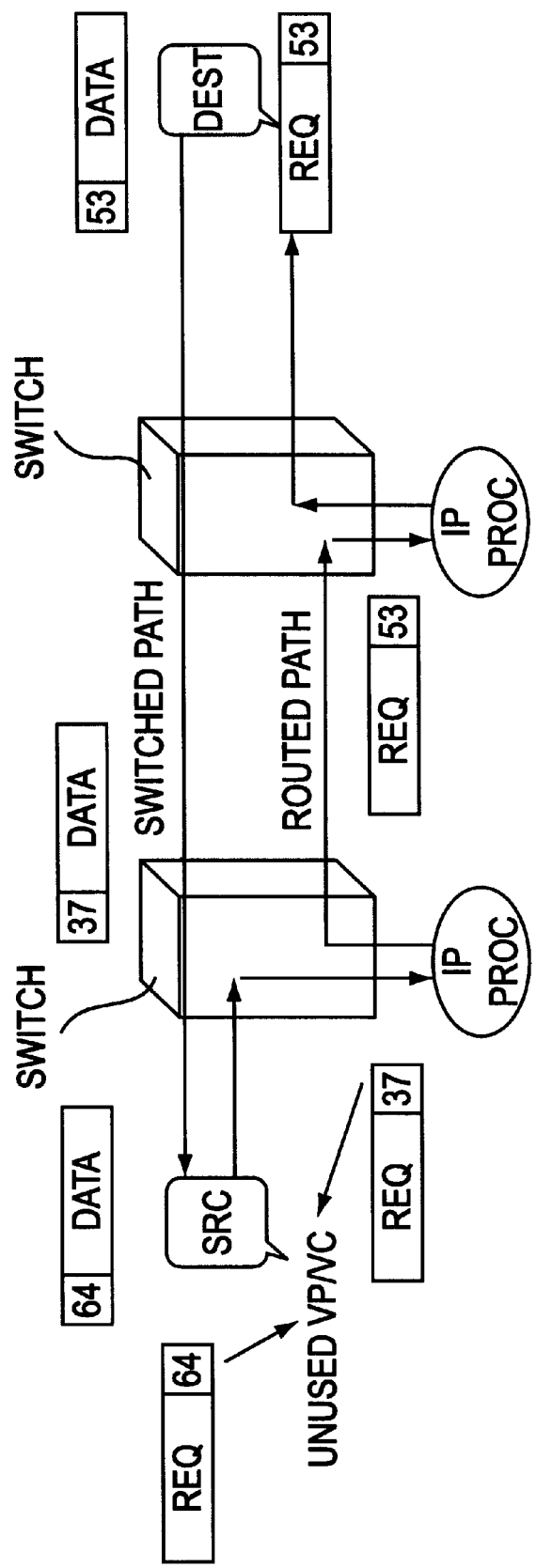
FIG. 11 shows a Peek and Reserve protocol for NFS data according to the present invention.
Figure 12A:
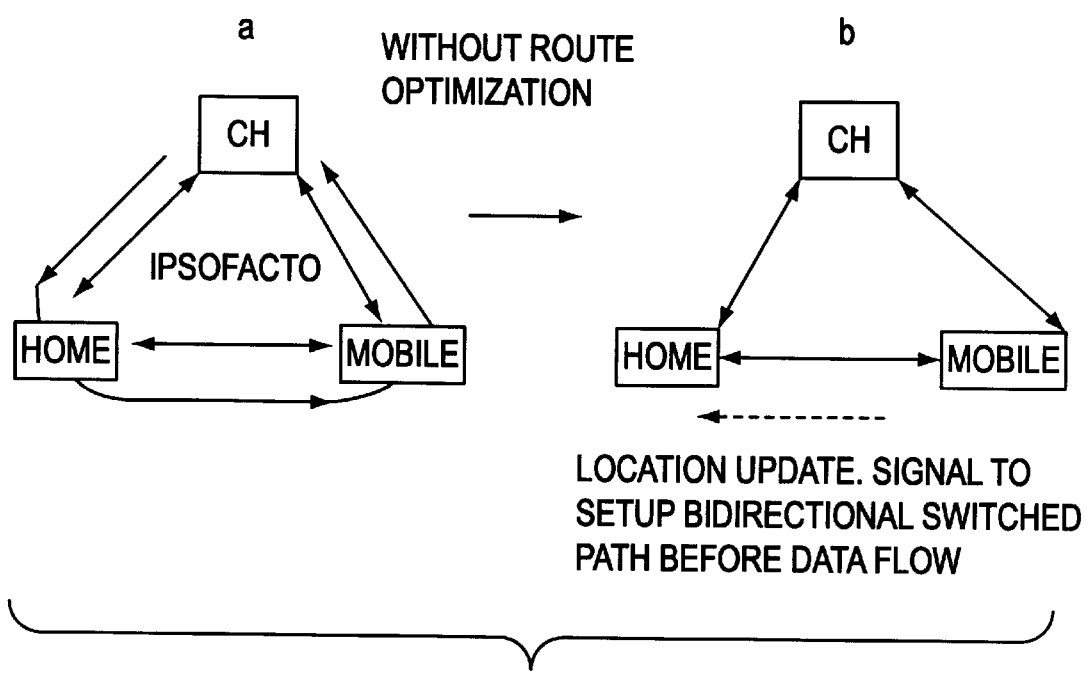
FIG. 12(a) shows the establishment of a mobile IP-o-ATM application without route optimization according to the present invention.
Figure 12B:
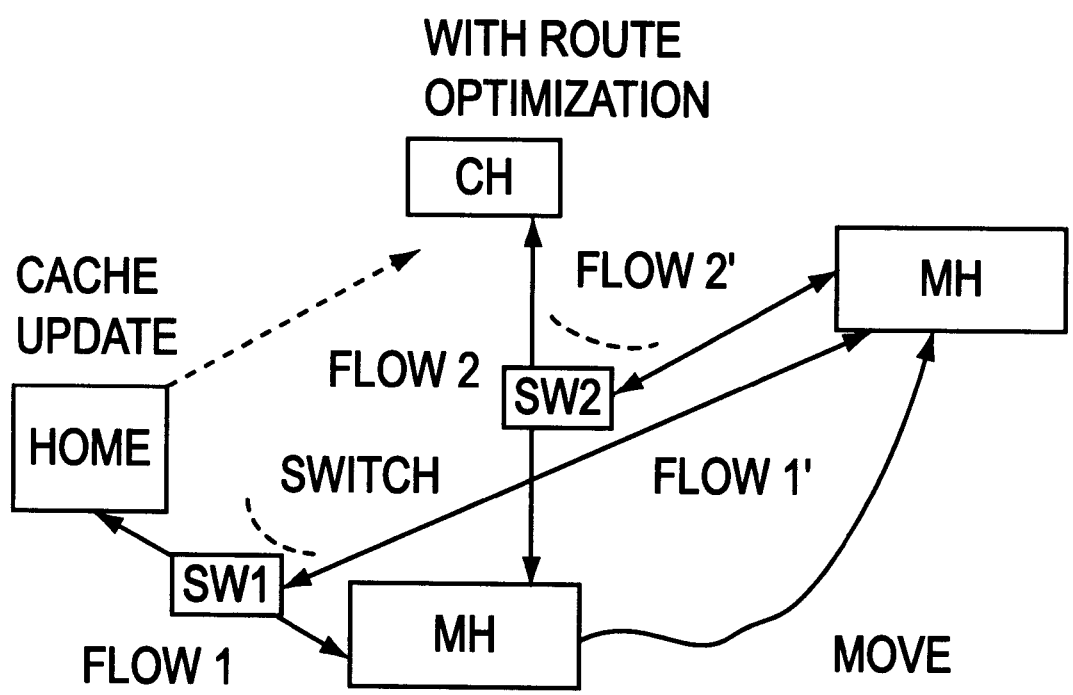
FIG. 12(b) shows the establishment of a mobile IP-o-ATM application with route optimization according to the present invention.
Figure 13:
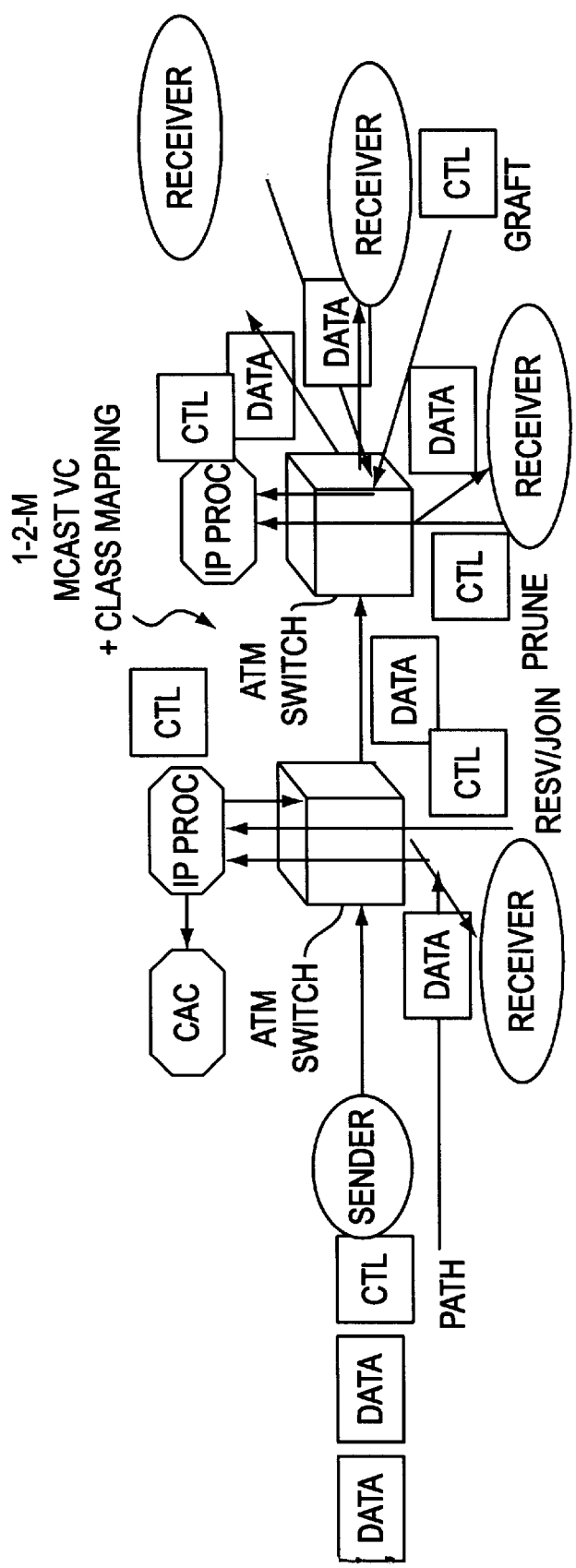
FIG. 13 shows multicast IP using RSVP-based flows according to the present invention.

Implementing filters at the ATM level is also possible if the filters are based on the source IP-address. This is because each (S,G) multicast tree rooted at the source gets mapped to a 1-2-m multicast VC at each switch. In this case, each 1-2-m multicast VC will come with a policy (for example a receiver may declare that during congestion, drop all packets from for example, firstname@address.com before dropping packets from secondname@address.com, in which case the cell marking threshold for the 1-2-m multicast VC emanating from thirdname@address.com will be much lower than that of secondname@address.com). The RSVP implementation for multicast flows is shown in FIG. 11.

Core Network Aggregation

As those skilled in the art can readily appreciate, switching on a per-flow basis can be expensive as we move to the core of the network, where flow aggregation is generally desirable. Since our inventive IPSOFACTO method has a dual IP/ATM stack, it is possible to use VP-level aggregation at the core of the network using either PVCs or SVCs using a native ATM stack and IPSOFACTO at the edge of the core network, mapping multiple IP switched flows to a route-based VP/VC setup using the native ATM stack.

Figure 14:
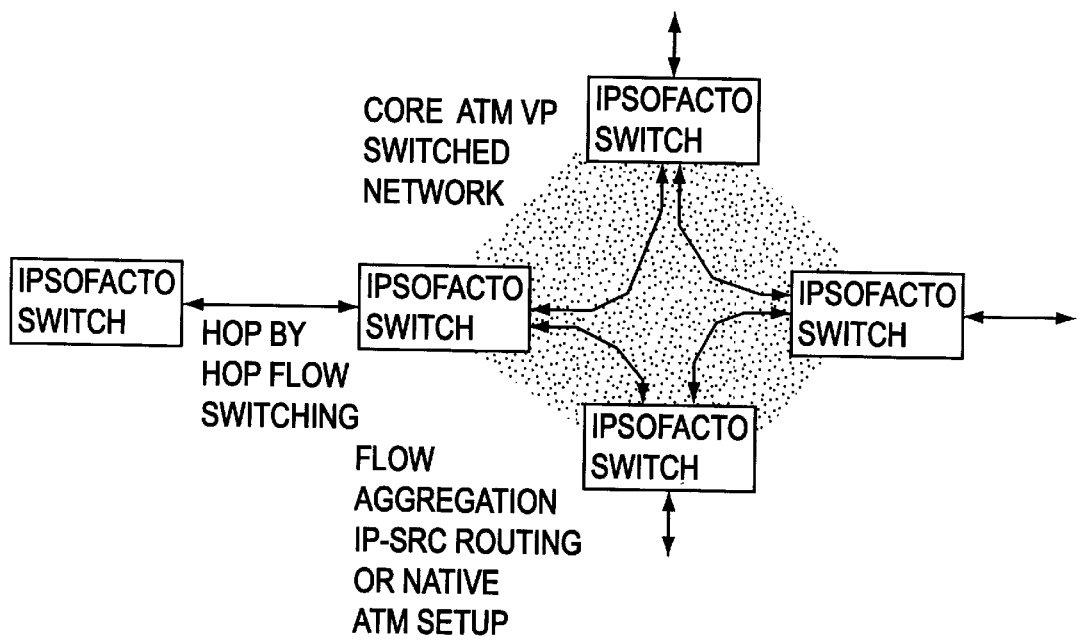
FIG. 14 shows flow aggregation according to the present invention.

The switches inside the core do not need to do flows based IP switching but just VP switching. The job of aggregating multiple flows to a VP is done at an IPSOFACTO-enabled edge switch. Setting up an SVC (or PVC) through the ATM core needs information from the IP routing module. One such option for this is to use IP source routing at the edge of the core network to set a SVC up for a given route. These SVCs are only torn down when all flows on a given route cease to exist. An illustration of route aggregation is shown in FIG. 14.

Performance Analysis Examples

In this section we will compare the performance of IPSOFACTO with that of the prior-art as well as pure IP routing and pure IP over ATM (using ATM signaling). A trace on an NFS backbone with a protocol analyzer is shown in Table 1.

TABLE 1

| Protocol | Pkts/sec | Flows/sec | Flow Duration | Pkts/Flow |
| --- | --- | --- | --- | --- |
| Mbone | 456 | 0.1 | 173 | 2307 |
| Ftp-data (TCP) | 2018 | 2.2 | 118 | 525 |
| Telnet (TCP) | 803 | 4.2 | 114 | 114 |
| DNS | 929 | 216.6 | 15 | 4 |
| Web (TCP) | 6717 | 73.0 | 57 | 74 |
| News (TCP) | 1096 | 0.7 | 177 | 62.7 |
| SNMP | 43 | 6.1 | 18 | 6 |
| Mail (TCP) | 9 | 0.4 | 27 | 21 |
| X-windows (TCP) | 111 | 0.2 | 161 | 276 |
| Total | 16700 | 420 | | |

A few noteworthy points about the analysis.

1. The Prior-Art Method #1 assumes a cost of switching (minimum 6 signaling messages between neigbours plus one IP packet processing) in their scheme while we have no switching cost as we simply do myopic hop-by-hop switching without any co-ordination. If we add the roundtrip latency between neighbours to the calculations, the results are skewed toward our inventive IPSOFACTO method even more.

2. Prior Art Method #1 switches based on duration of flow, the default IPSOFACTO policy is to make the first data packet go through the routed path and switch the rest.

3. The Prior Art Method #1 analysis assumes unicast IP traffic. It tunnels multicast traffic as encapsulated unicast traffic (IP in IP). Since our method uses the hardware multicast at the ATM level (1-2-m multicast VC) to switch multicast traffic, we expect IPSOFACTO to perform even better if IP-multicast traffic was included in the model. In the Prior Art Method #1 model, we assume that the multicast tree is already setup and in steady state before they decide to switch the flow as the system only uses idle data timers at the VC level to move a flow back from the switched mode so its not clear how prune messages reach the packet processor after the switch.

4. The Prior Art Method #1 model does not consider IP protocols with periodic refreshes. Once a flow is switched we assume that they ignore positive or negative refreshes and merely switch the flow out based on an idle timer. Our model explicitly forces periodic refreshes to the routed path, which has two ramifications, our processing load will be higher than Ipsilon for switched traffic as we process refreshes but on the other hand we do not need ATM level support to time VCs out. This implies that our connection management tables for the switched VCs will be less than Ipsilon's as we use packet level timers at the IP layer.

Our model is based on a trace taken on five minutes of traffic taken on an FDDI ring. The trace contained 16,700 packets per sec (average) and Prior Art Method #1 would switch 14,400 packets and route the rest (2600 pps). The number of flows needed to be switched turned out to be 92 flows per sec and the average number of established flows turned out to be 15,500 which was a guestimate of the size of their connection table. Given this, the following comparison follows:

Pure IP routing would need to process 16,700 packets per sec with no connection-management tables (ignores refresh based protocols, flows and treats each packet as a datatgram).

Pure IP over ATM, switching every packet requires that 420 flows per second be switched with an average of 40,000 entries in the connection table. This is beyond the ability of present-day ATM switches.

Prior Art Method #1 incurs a switching cost of 92 flows per sec with a connection table size of 15500 connections. The Prior Art Method #1 assumes that connection setup takes the equivalent of 7 IP packets processed per sec (but ignore the effect of propagation delay which will increase the number of packets that need to be processed rather than switched). So the effective work on the processor is computed as =2600 pps (forwarded packets)+92*7=3240 packets per sec with a connection table size of 15,500.

IPSOFACTO switches every flow but with no setup cost (due to uncoordinated setup). This translates to a a processing load of 420 packets per second (for the 420 flows per second) with a connection management flow of about 40,000.

If we assume that we will use embedded OAM cells for control (including FIN for TCP teardown) and also use periodic refreshes to allow IP level timers, the following performance of our IPSOFACTO method is determined. From the traces that are shown in Table 1, we take all the TCP flows in the table and look at the average call duration, for example the first TCP entry is TCP ftp-data with a call duration of 118.1 secs. Assuming Prior Art Method #1 starts their timer as soon as the data flow stops (extremely optimistic), the Prior Art Method #1 will tear this call down 60 secs later. Our inventive IPSOFACTO method will tear it down at 118.1 secs based on the SYN-FIN message. Such a call as this therefore has a holding time of 118.1 secs for our IPSOFACTO method and 178.1 secs for Prior Art Method #1. Therefore, every TCP entry shown in Table 1 when applied to the Prior Art Method #1, will have an excess holding time of 60 secs over our IPSO-FACTO method. Based upon Prior Art Method #1 tables, and out of the total 420 flows per sec, 197.3 flows are TCP flows that would be overestimated by the protocol and stay in the connection management tables. This translates to 11838 extra entries in the table due to the idle timer. Thus the actual number of connections IPSOFACTO will manage is 28162 just by optimizing the TCP performance. If we add the direct refreshes with IP level timers, for IP multicast and RSVP flows, the savings will be even more. In an envisioned version of our IPSOFACTO method, with no cell level soft state, the number of active VCs will be as less as 10,000. The multicast spec specifies a refresh rate of 1 packet per flow every 30 seconds. This adds an extra processing overhead of $\frac{1}{30}$ of the total number of multicast flows per sec. Since the trace showed only a flow rate of 0.1 flow per sec for the Mbone traffic, the increased processing on the router is trivial ($\frac{1}{30}*0.1$ packets per sec).

Based on Prior Art Method #1 modeling, IPSOFACTO advantageously provides low-complexity, fast set up IP processing (average 440 packet per second flow with 9500 active connections) as opposed to the Prior Art Method #1 (3240 packets per second and 15500 active connections) and Pure IP routing (16,700 flows per second) and classical IP over ATM (420 flows per sec, 40,000 active connections).

While there has been described and illustrated a method of utilizing, it will be apparent to those skilled in the art that modifications and variations are possible without deviating from the broad principle and spirit of the invention which shall be limited solely by the scope of the claims appended hereto.

What is claimed is:

1. A method for transmitting connectionless packet data between a source and destination over an ATM network comprising one or more nodes wherein each one of said nodes includes an ATM switch connected to a packet router, wherein each ATM switch contains one or more routing tables identifying a plurality of VC's and each packet router contains one or more lookup tables, each one of said tables identifying a plurality of ports, said method comprising the steps of:

a) initializing, in each one of said ATM switches, said routing tables such that an inbound VC points to the packet router connected to the switch;

b) transmitting, on a first unused VC, a connectionless packet from said source to a first one of said ATM switches such that said packet is forwarded to the router connected to the ATM switch as directed by the routing table within said ATM switch;

c) identifying, by said router, an outbound port on said ATM switch according to said connectionless packet and the lookup table in the router;

d) identifying, a first unused VP/VC associated with said outbound port;

e) establishing, at said ATM switch, a switched path to a downstream ATM switch by mapping the inbound VC to the outbound port;

f) forwarding, simultaneously with establishing step e, said connectionless packet through said outbound port to the downstream ATM switch such that said packet is forwarded to the router connected to the downstream ATM switch as directed by the routing table within said downstream ATM switch;

g) repeating the above steps c–f in an uncoordinated, hop-by-hop manner until a switched path is established from the source to the destination such that a persistent routed control path and a switched data path are simultaneously established between said source and said destination and that all subsequent connectionless packets transmitted from source to destination traverse either the routed control path or the switched data path as indicated within each of said subsequent connectionless packets.

2. The method according to claim 1 wherein said establishment step is successively performed at each of said routers independently of other routers in the path.

3. The method according to claim 2 wherein said connectionless packets are IP packets selected from one of the following types: Internet Protocol (IP), Internet Packet Exchange (IPX), or Frame Relay (FR).

4. The method according to claim 3 wherein said connectionless packets sent from the source to the destination via the routed control path are operations, administration and maintenance (OA&M) packets and connectionless packets sent from the source to the destination via the switched path are not OA&M packets.

5. The method according to claim 4 wherein said establishment step further comprises the steps of:

establishing an upstream-directed switched path simultaneously with the establishment of the downstream-directed switched path such that a bi-directional switched data path is established.

6. The method according to claim 5 wherein said switched control path establishment comprises the steps of:

transporting, from the source to the destination and over said persistent routed control path, a SYNchronize message; and transporting, from the destination to the source, over said persistent routed control path and upon receipt of the SYNchronize message by the destination, an ACKnowledge message.

7. The method according to claim 6 further comprising the step of:

dis-establishing said routed control path and said switched data path upon the completion of packet data transmission by transmitting a FINish message from said source to said destination over said routed control path.

8. The method according to claim 1 further comprising the steps of:

transmitting, within said transmitting step b, a PATH message from said source to said destination followed by one or more data packets wherein said PATH message contains information about the destination (flow spec) as well as a traffic class and resources needed (Tspec); and comparing, when said PATH message arrives at said destination, a delay expected on the path with a delay requested by the source and transmitting, in response to said comparison, a RESV message from the destination to the source and over the same path traversed by said PATH message such that each ATM switch in this path locks in a request for service.

9. The method according to claim 1 further comprising the steps of:

h) establishing a first flow SVC according to steps a–f, above wherein said flow enters the ATM network at an access ATM switch and exits the ATM network at an egress ATM switch;

i) transporting, subsequent flows destined for said egress ATM switch on a same VP with different VC;

j) terminating a VP/VC upon receipt of a last packet of a last flow by said egress ATM switch.

10. A method for transmitting packet data between a source and a plurality of destinations over an ATM network comprising one or more nodes wherein each one of said nodes includes an ATM switch connected to a packet router, said method comprising the steps of:

establishing a persistent routed control path between said source and each one of said destinations and on a hop-by-hop basis through a set of the packet routers in the ATM network;

establishing a switched data path simultaneously with the establishment of the routed control path and distinct from said routed control path, between said source and each one of said destinations through a set of the ATM switches in the ATM network; and transporting packets from the source to each one of the destinations such that control packets are transported on the routed control path, data packets having an associated virtual circuit are transported on the switched data path, and data packets without an associated virtual circuit are transported on the routed control path.

11. The method according to claim 10 wherein said control path establishment step is successively performed at one or more of the routers independently of other routers in the path.

12. The method according to claim, 11 wherein said switched data path establishment step further comprises the following steps:

transmitting, from the source on said persistent routed control path, an IP datagram on an unused VP/VC;

trapping the datagram at an ATM switch having a VP/VC table;

inspecting a multicast address contained within said datagram;

determining, a set of receivers that the datagram needs to be forwarded to; and reconfiguring the VP/VC table within said switch such that a multicast is established.

13. The method according to claim 12 wherein said switched data path establishment step comprises the steps of:

establishing a forward-directed switched data path simultaneously with the establishment of the routed control path and distinct from said routed control path, between said source and said destination over the ATM network; and establishing a reverse-directed switched data path simultaneously with the establishment of the forward-directed switched data path according to characteristics of the connectionless packet such that a bi-directional switched data path is successively established through one or more of the ATM switches from the source to the destination.

* * * * *

UNITED STATES PATENT AND TRADEMARK OFFICE
CERTIFICATE OF CORRECTION

PATENT NO. : 5,903,559
DATED : May 11, 1999
INVENTOR(S) : ACHARYA, ARUP, DIGHE, RAJIV

It is certified that error appears in the above-identified patent and that said Letters Patent is hereby corrected as shown below:

Col. 19, Line 24, delete "CAM", and insert --OAM--.

Signed and Sealed this

Fourth Day of January, 2000

Attest:

Attesting Officer

*Acting Commissioner of Patents and Trademarks*